(12) United States Patent
Wegerich

(10) Patent No.: US 8,239,170 B2
(45) Date of Patent: Aug. 7, 2012

(54) COMPLEX SIGNAL DECOMPOSITION AND MODELING

(75) Inventor: Stephan W. Wegerich, Glendale Heights, IL (US)

(73) Assignee: Smartsignal Corporation, Lisle, IL (US)

( * ) Notice: Subject to any disclaimer, the term of this patent is extended or adjusted under 35 U.S.C. 154(b) by 374 days.

(21) Appl. No.: 12/055,471

(22) Filed: Mar. 26, 2008

(65) Prior Publication Data

US 2008/0215291 A1 Sep. 4, 2008

Related U.S. Application Data

(63) Continuation of application No. 11/126,488, filed on May 11, 2005, now Pat. No. 7,409,320, and a continuation of application No. 09/800,977, filed on Mar. 8, 2001, now Pat. No. 6,957,172.

(60) Provisional application No. 60/187,949, filed on Mar. 9, 2000.

(51) Int. Cl.
*H03F 1/26* (2006.01)
(52) U.S. Cl. ...................................... 702/189
(58) Field of Classification Search .............. 702/70–71, 702/73–74, 189–190
See application file for complete search history.

(56) References Cited

U.S. PATENT DOCUMENTS

| | | |
|---|---|---|
| 3,045,221 A | 7/1962 | Roop |
| 3,561,237 A | 2/1971 | Eggers |
| 3,651,454 A | 3/1972 | Venema et al. |
| 3,767,900 A | 10/1973 | Chao et al. |
| 3,851,157 A | 11/1974 | Ellis et al. |
| 3,866,166 A | 2/1975 | Kerscher et al. |
| 3,906,437 A | 9/1975 | Brandwein et al. |
| 3,928,022 A | 12/1975 | Langagne |
| 3,992,884 A | 11/1976 | Pacault |
| 4,057,847 A | 11/1977 | Lowell et al. |
| 4,060,716 A | 11/1977 | Pekrul et al. |
| 4,067,061 A | 1/1978 | Juhasz |
| 4,071,898 A | 1/1978 | Schorsch et al. |
| 4,080,654 A | 3/1978 | Walley, Jr. |
| 4,212,064 A | 7/1980 | Forsythe et al. |
| 4,215,412 A | 7/1980 | Bernier et al. |

(Continued)

FOREIGN PATENT DOCUMENTS

EP 0840244 5/1998

(Continued)

OTHER PUBLICATIONS

"MSET Modeling of Crystal River-3 Venturi Flow Meters" by J.P. Herzog, S.W. Wegerich, K.C. Gross, and F.K. Bockhorst, 6th International Conference on Nuclear Engineering, ICONE-6169, May 10-14, 1998, Copyright 1998 ASME (12 pp).

(Continued)

*Primary Examiner* — Drew A Dunn
*Assistant Examiner* — Stephen Cherry
(74) *Attorney, Agent, or Firm* — Global Patent Operation; Mark Conklin

(57) ABSTRACT

A system, method and program product for monitoring a complex signal for ultrasensitive detection of state changes, or for signature recognition and classification is provided. A complex signal is decomposed periodically for empirical modeling. Wavelet analysis, frequency band filtering or other methods may be used to decompose the complex signal into components. A library of signature data may be referenced for selection of a recognized signature in the decomposed complex signal. The recognized signature may indicate data being carried in the complex signal. Estimated signal data may be generated for determination of an operational state of a monitored process or machine using a statistical hypothesis test with reference to the decomposed input signal.

12 Claims, 8 Drawing Sheets

U.S. PATENT DOCUMENTS

| | | | |
|---|---|---|---|
| 4,267,569 A | 5/1981 | Baumann et al. |
| 4,271,402 A | 6/1981 | Kastura et al. |
| 4,295,128 A | 10/1981 | Hashemian et al. |
| 4,296,409 A | 10/1981 | Whitaker et al. |
| 4,330,838 A | 5/1982 | Yoneda et al. |
| 4,334,136 A | 6/1982 | Mahan et al. |
| 4,336,595 A | 6/1982 | Adams et al. |
| 4,368,510 A | 1/1983 | Anderson |
| 4,398,258 A | 8/1983 | Naitoh et al. |
| 4,402,054 A | 8/1983 | Osborne et al. |
| RE31,582 E | 5/1984 | Hosaka |
| RE31,750 E | 11/1984 | Morrow |
| 4,480,480 A | 11/1984 | Scott et al. |
| 4,517,468 A | 5/1985 | Kemper et al. |
| 4,521,885 A | 6/1985 | Melocik et al. |
| 4,639,882 A | 1/1987 | Keats |
| 4,667,176 A | 5/1987 | Matsuda |
| 4,677,429 A | 6/1987 | Glotzbach |
| 4,707,796 A | 11/1987 | Calabro et al. |
| 4,761,748 A | 8/1988 | Le Rat et al. |
| 4,773,021 A | 9/1988 | Harris et al. |
| 4,796,205 A | 1/1989 | Ishii et al. |
| 4,823,290 A | 4/1989 | Fasack et al. |
| 4,841,456 A | 6/1989 | Hogan, Jr. et al. |
| 4,849,894 A | 7/1989 | Probst |
| 4,924,418 A | 5/1990 | Bachman et al. |
| 4,931,977 A | 6/1990 | Klemes |
| 4,937,763 A | 6/1990 | Mott |
| 4,965,513 A | 10/1990 | Haynes et al. |
| 4,965,549 A | 10/1990 | Koike |
| 4,975,685 A | 12/1990 | Rahhal |
| 4,975,827 A | 12/1990 | Yonezawa |
| 4,978,291 A | 12/1990 | Nakai |
| 4,978,909 A | 12/1990 | Hendrix et al. |
| 4,985,857 A | 1/1991 | Bajpai et al. |
| 4,990,885 A | 2/1991 | Irick et al. |
| 5,003,478 A | 3/1991 | Kobayashi et al. |
| 5,003,479 A | 3/1991 | Kobayashi et al. |
| 5,003,950 A | 4/1991 | Kato et al. |
| 5,005,142 A | 4/1991 | Lipchak et al. |
| 5,005,147 A | 4/1991 | Krishen et al. |
| 5,009,833 A | 4/1991 | Takeuchi et al. |
| 5,010,487 A | 4/1991 | Stonehocker |
| 5,012,414 A | 4/1991 | Ishii et al. |
| 5,012,421 A | 4/1991 | Ishii |
| 5,025,499 A | 6/1991 | Inoue et al. |
| 5,034,889 A | 7/1991 | Abe |
| 5,038,545 A | 8/1991 | Hiendl |
| 5,052,630 A | 10/1991 | Hinsey et al. |
| 5,056,023 A | 10/1991 | Abe |
| 5,063,513 A | 11/1991 | Shank et al. |
| 5,067,099 A | 11/1991 | McCown et al. |
| 5,072,391 A | 12/1991 | Abe |
| 5,088,058 A | 2/1992 | Salsburg |
| 5,091,856 A | 2/1992 | Hasegawa et al. |
| 5,093,792 A | 3/1992 | Takl et al. |
| 5,109,700 A | 5/1992 | Hicho |
| 5,113,483 A | 5/1992 | Keeler et al. |
| 5,119,287 A | 6/1992 | Nakamura et al. |
| 5,119,468 A | 6/1992 | Owens |
| 5,123,017 A | 6/1992 | Simpkins et al. |
| 5,164,895 A | 11/1992 | Lunz et al. |
| 5,166,873 A | 11/1992 | Takatsu et al. |
| 5,173,856 A | 12/1992 | Purnell et al. |
| 5,187,735 A | 2/1993 | Herrero Garcia et al. |
| 5,195,046 A | 3/1993 | Gerardi et al. |
| 5,210,704 A | 5/1993 | Husseiny |
| 5,213,080 A | 5/1993 | Lambert et al. |
| 5,214,582 A | 5/1993 | Gray |
| 5,222,065 A | 6/1993 | Krogmam |
| 5,223,207 A | 6/1993 | Gross et al. |
| 5,239,462 A | 8/1993 | Jones et al. |
| 5,251,285 A | 10/1993 | Inoue et al. |
| 5,255,208 A | 10/1993 | Thakore et al. |
| 5,262,941 A | 11/1993 | Saladin et al. |
| 5,285,494 A | 2/1994 | Sprecher et al. |
| 5,291,420 A | 3/1994 | Matsumoto et al. |
| 5,309,139 A | 5/1994 | Austin |
| 5,309,351 A | 5/1994 | McCain et al. |
| 5,309,379 A | 5/1994 | Rawlings et al. |
| 5,311,562 A | 5/1994 | Palusamy et al. |
| 5,325,304 A | 6/1994 | Aoki |
| 5,327,349 A | 7/1994 | Hoste |
| 5,333,240 A | 7/1994 | Matsumoto et al. |
| 5,361,336 A | 11/1994 | Atchison |
| 5,386,373 A | 1/1995 | Keeler et al. |
| 5,387,783 A | 2/1995 | Mihm et al. |
| 5,390,776 A | 2/1995 | Thompson |
| 5,402,333 A | 3/1995 | Cardner |
| 5,402,521 A | 3/1995 | Niida et al. |
| 5,410,492 A | 4/1995 | Gross et al. |
| 5,414,619 A | 5/1995 | Katayama et al. |
| 5,414,632 A | 5/1995 | Mochizuki et al. |
| 5,420,571 A | 5/1995 | Coleman et al. |
| 5,421,204 A | 6/1995 | Svaty, Jr. |
| 5,442,553 A | 8/1995 | Parrillo |
| 5,445,347 A | 8/1995 | Ng |
| 5,446,671 A | 8/1995 | Weaver et al. |
| 5,446,672 A | 8/1995 | Boldys |
| 5,450,321 A | 9/1995 | Crane |
| 5,450,537 A | 9/1995 | Hirai et al. |
| 5,455,777 A | 10/1995 | Fujiyama et al. |
| 5,459,675 A | 10/1995 | Gross et al. |
| 5,463,768 A | 10/1995 | Cuddihy et al. |
| 5,463,769 A | 10/1995 | Tate et al. |
| 5,465,321 A | 11/1995 | Smyth |
| 5,473,532 A | 12/1995 | Unno et al. |
| 5,481,647 A | 1/1996 | Brody et al. |
| 5,486,997 A | 1/1996 | Reismiller et al. |
| 5,495,168 A | 2/1996 | de Vries |
| 5,496,450 A | 3/1996 | Blumenthal et al. |
| 5,500,940 A | 3/1996 | Skeie |
| 5,502,543 A | 3/1996 | Aboujaoude |
| 5,526,446 A | 6/1996 | Adelson et al. |
| 5,539,638 A | 7/1996 | Keeler et al. |
| 5,544,320 A | 8/1996 | Konrad |
| 5,548,528 A | 8/1996 | Keeler et al. |
| 5,553,239 A | 9/1996 | Heath et al. |
| 5,559,710 A | 9/1996 | Shahraray et al. |
| 5,561,431 A | 10/1996 | Peele et al. |
| 5,566,092 A | 10/1996 | Wang et al. |
| 5,574,387 A | 11/1996 | Petsche et al. |
| 5,579,232 A | 11/1996 | Tong et al. |
| 5,586,066 A | 12/1996 | White et al. |
| 5,596,507 A | 1/1997 | Jones et al. |
| 5,600,726 A | 2/1997 | Morgan et al. |
| 5,602,733 A | 2/1997 | Rogers et al. |
| 5,608,845 A | 3/1997 | Ohtsuka et al. |
| 5,610,339 A | 3/1997 | Haseley et al. |
| 5,611,052 A | 3/1997 | Dykstra et al. |
| 5,612,886 A | 3/1997 | Weng |
| 5,617,342 A | 4/1997 | Elazouni |
| 5,623,109 A | 4/1997 | Uchida et al. |
| 5,629,872 A | 5/1997 | Grosse et al. |
| 5,629,878 A | 5/1997 | Kobrosly |
| 5,629,879 A | 5/1997 | Lelle |
| 5,638,413 A | 6/1997 | Uematsu et al. |
| 5,640,103 A | 6/1997 | Petsche et al. |
| 5,644,463 A | 7/1997 | El-Sharkawi et al. |
| 5,657,245 A | 8/1997 | Hecht et al. |
| 5,663,894 A | 9/1997 | Seth et al. |
| 5,668,944 A | 9/1997 | Berry |
| 5,671,635 A | 9/1997 | Nadeau et al. |
| 5,680,409 A | 10/1997 | Qin et al. |
| 5,680,541 A | 10/1997 | Kurosu et al. |
| 5,682,317 A | 10/1997 | Keeler et al. |
| 5,689,416 A | 11/1997 | Shimizu et al. |
| 5,689,434 A | 11/1997 | Tambini et al. |
| 5,696,907 A | 12/1997 | Tom |
| 5,699,403 A | 12/1997 | Ronnen |
| 5,704,029 A | 12/1997 | Wright, Jr. |
| 5,708,780 A | 1/1998 | Levergood et al. |
| 5,710,715 A | 1/1998 | Shitanda |
| 5,710,723 A | 1/1998 | Hoth et al. |
| 5,714,683 A | 2/1998 | Maloney |
| 5,727,144 A | 3/1998 | Brady et al. |
| 5,727,163 A | 3/1998 | Bezos |

| | | | | | |
|---|---|---|---|---|---|
| 5,737,228 A | 4/1998 | Ishizuka et al. | 5,995,911 A | 11/1999 | Hart |
| 5,745,382 A | 4/1998 | Vilim et al. | 5,995,916 A | 11/1999 | Nixon et al. |
| 5,745,654 A | 4/1998 | Titan | 5,995,947 A | 11/1999 | Fraser et al. |
| 5,748,469 A | 5/1998 | Pyotsia | 6,000,832 A | 12/1999 | Franklin et al. |
| 5,748,496 A | 5/1998 | Takahashi et al. | 6,002,839 A | 12/1999 | Keeler et al. |
| 5,751,580 A | 5/1998 | Chi | 6,006,192 A | 12/1999 | Cheng et al. |
| 5,753,805 A | 5/1998 | Maloney | 6,006,260 A | 12/1999 | Barrick, Jr. et al. |
| 5,754,451 A | 5/1998 | Williams | 6,009,381 A | 12/1999 | Ono |
| 5,754,965 A | 5/1998 | Hagenbuch | 6,013,108 A | 1/2000 | Karolys et al. |
| 5,757,309 A | 5/1998 | Brooks et al. | 6,014,598 A | 1/2000 | Duyar et al. |
| 5,761,090 A | 6/1998 | Gross et al. | 6,014,645 A | 1/2000 | Cunningham |
| 5,761,640 A | 6/1998 | Kalyanswamy et al. | 6,021,396 A | 2/2000 | Ramaswamy et al. |
| 5,764,509 A | 6/1998 | Gross et al. | 6,023,507 A | 2/2000 | Wookey |
| 5,774,379 A | 6/1998 | Gross et al. | 6,026,348 A | 2/2000 | Hala |
| 5,774,882 A | 6/1998 | Keen et al. | 6,029,097 A | 2/2000 | Branicky et al. |
| 5,774,883 A | 6/1998 | Andersen et al. | 6,029,149 A | 2/2000 | Dykstra et al. |
| 5,784,285 A | 7/1998 | Tamaki et al. | 6,029,890 A | 2/2000 | Austin |
| 5,787,138 A | 7/1998 | Ocieczek et al. | 6,041,287 A | 3/2000 | Dister et al. |
| 5,790,977 A | 8/1998 | Ezekiel | 6,049,738 A | 4/2000 | Kayama et al. |
| 5,792,072 A | 8/1998 | Keefe | 6,049,741 A | 4/2000 | Kawamura |
| 5,796,633 A | 8/1998 | Burgess et al. | 6,049,827 A | 4/2000 | Sugauchi et al. |
| 5,797,133 A | 8/1998 | Jones et al. | 6,064,916 A | 5/2000 | Yoon |
| 5,799,043 A | 8/1998 | Chang et al. | 6,076,048 A | 6/2000 | Gunther et al. |
| 5,802,509 A | 9/1998 | Maeda et al. | 6,076,088 A | 6/2000 | Paik et al. |
| 5,805,442 A | 9/1998 | Crater et al. | 6,088,626 A | 7/2000 | Lilly et al. |
| 5,808,903 A | 9/1998 | Schiltz et al. | 6,088,686 A | 7/2000 | Walker et al. |
| 5,809,490 A | 9/1998 | Guiver et al. | 6,100,901 A | 8/2000 | Mohda et al. |
| 5,817,958 A | 10/1998 | Uchida et al. | 6,104,965 A | 8/2000 | Lim et al. |
| 5,818,716 A | 10/1998 | Chin et al. | 6,105,007 A | 8/2000 | Norris |
| 5,819,029 A | 10/1998 | Edwards et al. | 6,107,919 A | 8/2000 | Wilks et al. |
| 5,819,236 A | 10/1998 | Josephson | 6,108,616 A | 8/2000 | Borchers et al. |
| 5,819,291 A | 10/1998 | Haimowitz et al. | 6,110,214 A | 8/2000 | Klimasauskas |
| 5,822,212 A | 10/1998 | Tanaka et al. | 6,112,190 A | 8/2000 | Fletcher et al. |
| 5,832,465 A | 11/1998 | Tom | 6,115,653 A | 9/2000 | Bergstrom et al. |
| 5,841,677 A | 11/1998 | Yang et al. | 6,119,111 A | 9/2000 | Gross et al. |
| 5,842,157 A | 11/1998 | Wehhofer et al. | 6,125,351 A | 9/2000 | Kauffman |
| 5,845,230 A | 12/1998 | Lamberson | 6,128,540 A | 10/2000 | Van Der Vegt et al. |
| 5,845,627 A | 12/1998 | Olin et al. | 6,128,543 A | 10/2000 | Hitchner |
| 5,848,396 A | 12/1998 | Gerace | 6,131,076 A | 10/2000 | Stephan et al. |
| 5,864,773 A | 1/1999 | Barna et al. | 6,141,647 A | 10/2000 | Meijer et al. |
| 5,867,118 A | 2/1999 | McCoy et al. | 6,141,674 A | 10/2000 | Unkrich et al. |
| 5,870,721 A | 2/1999 | Norris | 6,144,893 A | 11/2000 | Van Der Vegt et al. |
| 5,878,403 A | 3/1999 | DeFrancesco et al. | 6,181,975 B1 | 1/2001 | Gross et al. |
| 5,886,913 A | 3/1999 | Marguinaud et al. | 6,182,022 B1 | 1/2001 | Mayle et al. |
| 5,895,177 A | 4/1999 | Iwai et al. | 6,202,038 B1 | 3/2001 | Wegerich et al. |
| 5,905,989 A | 5/1999 | Biggs | 6,236,908 B1 | 5/2001 | Cheng et al. |
| 5,909,368 A | 6/1999 | Nixon et al. | 6,240,372 B1 | 5/2001 | Gross et al. |
| 5,911,135 A | 6/1999 | Atkins | 6,245,517 B1 | 6/2001 | Chen et al. |
| 5,913,911 A | 6/1999 | Beck et al. | 6,246,972 B1 | 6/2001 | Klimasauskas |
| 5,917,428 A | 6/1999 | Discenzo et al. | 6,272,449 B1 | 8/2001 | Passera |
| 5,921,099 A | 7/1999 | Lee | 6,278,962 B1 | 8/2001 | Klimasauskas et al. |
| 5,930,156 A | 7/1999 | Kennedy | 6,289,330 B1 | 9/2001 | Jannarone |
| 5,930,776 A | 7/1999 | Dykstra et al. | 6,327,574 B1 | 12/2001 | Kramer et al. |
| 5,930,779 A | 7/1999 | Knoblock et al. | 6,331,864 B1 | 12/2001 | Coco et al. |
| 5,933,352 A | 8/1999 | Salut | 6,356,857 B1 | 3/2002 | Qin et al. |
| 5,933,818 A | 8/1999 | Kasravi et al. | 6,393,373 B1 | 5/2002 | Duyar et al. |
| 5,940,298 A | 8/1999 | Pan et al. | 6,418,431 B1 | 7/2002 | Mahajan et al. |
| 5,940,811 A | 8/1999 | Norris | 6,424,958 B1 | 7/2002 | Pappalardo et al. |
| 5,940,812 A | 8/1999 | Tengel et al. | 6,480,810 B1 | 11/2002 | Cardella et al. |
| 5,943,634 A | 8/1999 | Piety et al. | 6,502,082 B1 | 12/2002 | Toyama et al. |
| 5,946,661 A | 8/1999 | Rothschild et al. | 6,519,552 B1 | 2/2003 | Sampath et al. |
| 5,946,662 A | 8/1999 | Ettl et al. | 6,532,426 B1 | 3/2003 | Hooks et al. |
| 5,949,678 A | 9/1999 | Wold et al. | 6,539,343 B2 | 3/2003 | Zhao et al. |
| 5,950,147 A | 9/1999 | Sarangapani et al. | 6,556,939 B1 | 4/2003 | Wegerich |
| 5,950,179 A | 9/1999 | Buchanan et al. | 6,567,795 B2 | 5/2003 | Alouani et al. |
| 5,956,487 A | 9/1999 | Venkatraman et al. | 6,591,166 B1 | 7/2003 | Millett et al. |
| 5,956,664 A | 9/1999 | Bryan | 6,591,296 B1 | 7/2003 | Ghanime |
| 5,960,411 A | 9/1999 | Hartman et al. | 6,609,212 B1 | 8/2003 | Smith |
| 5,960,435 A | 9/1999 | Rathmann et al. | 6,731,990 B1 | 5/2004 | Carter et al. |
| 5,961,560 A | 10/1999 | Kemner | 6,751,575 B2 | 6/2004 | Lenz et al. |
| 5,963,884 A | 10/1999 | Billington et al. | 6,775,641 B2 | 8/2004 | Wegerich et al. |
| 5,966,699 A | 10/1999 | Zandi | 6,826,552 B1 | 11/2004 | Grosser et al. |
| 5,970,430 A | 10/1999 | Burns et al. | 6,859,739 B2 | 2/2005 | Wegerich et al. |
| 5,970,478 A | 10/1999 | Walker et al. | 6,876,943 B2 | 4/2005 | Wegerich |
| 5,987,399 A | 11/1999 | Wegerich et al. | 6,898,469 B2 | 5/2005 | Bickford |
| 5,987,434 A | 11/1999 | Libman | 6,898,554 B2 | 5/2005 | Jaw et al. |
| 5,991,525 A | 11/1999 | Shah et al. | 6,917,839 B2 | 7/2005 | Bickford |
| 5,991,735 A | 11/1999 | Gerace | 6,941,287 B1 | 9/2005 | Vaidyanathan et al. |
| 5,993,041 A | 11/1999 | Toba | 6,952,662 B2 | 10/2005 | Wegerich et al. |

| | | | |
|---|---|---|---|
| 6,957,172 | B2 | 10/2005 | Wegerich |
| 7,233,886 | B2 | 6/2007 | Wegerich et al. |
| 7,373,283 | B2 | 5/2008 | Herzog et al. |
| 7,386,426 | B1 | 6/2008 | Black et al. |
| 7,739,096 | B2 | 6/2010 | Wegerich et al. |
| 2002/0065698 | A1 | 5/2002 | Schick |
| 2003/0060808 | A1 | 3/2003 | Wilk |
| 2003/0126258 | A1 | 7/2003 | Conkright et al. |

FOREIGN PATENT DOCUMENTS

| | | |
|---|---|---|
| JP | 61-160111 | 7/1986 |
| JP | 02-004300 | 1/1990 |
| JP | 05-126980 | 5/1993 |
| JP | 06-274784 | 9/1994 |
| JP | 06278179 | 10/1994 |
| JP | 7243876 | 9/1995 |
| JP | 08220279 | 8/1996 |
| JP | 09-166483 | 6/1997 |
| JP | 11-311591 | 11/1999 |
| WO | WO9504878 | 2/1995 |
| WO | WO9722073 | 6/1997 |
| WO | WO 00/67412 | 11/2000 |
| WO | WO0067412 | 11/2000 |
| WO | WO0167262 | 9/2001 |

OTHER PUBLICATIONS

"Application of the New Technique for Modeling System Behavior" by Paul J. O'Sullivan, presented at the ISA Symposium, Edmonton, Alberta, May 1, 1991, Copyright 1991 Instrument Society of America (21 pp).

A Universal, Fault-Tolerant, Non-Linear Analystic Network for Modeling and Fault Detection, by J.E. Mott, R.W. King, L.R. Monson, D.L. Olson, and J.D. Staffron, Proceedings of the 8th Power Plant Dynamics, Control & Testing Symposium, Knoxville, Tennessee, May 27-29, 1992 (14 pp).

ModelWare product review by Robert D. Flori, reprinted from Computerized Investing, Sep./Oct. 1992, vol. XI, No. 5, Copyright by the American Association of Individual Investors (pp. 8-10).

ModelWare A New Approach to Prediction by Ken Tucker, reprinted from PC Al Magazine, Jan./Feb. 1993, pp. 14, 15, 30.

"Similarity Based Regression: Applied Advanced Pattern Recognition for Power Plant Analysis," by E.J. Hansen and M.B. Caudill, presented at the 1994 EPRI Heat Rate Improvement Conference (9 pp.).

"Applied Pattern Recognition for Plant Monitoring and Data Validation," by Ron Griebenow, E.J. Hansen, and A.L. Sudduth, presented at the Fifth International Joint ISA POWID/EPRI Controls and Instrumentation Conference, La Jolla, California, Jun. 19-21, 1995 (11 pp.).

"Model-Based Nuclear Power Plant Monitoring and Fault Detection: Theoretical Foundations," by Ralph M. Singer, Kenny C. Gross, James P. Herzog, Ronald W. King, and Stephen Wegerich, presented at the International Conference on Intelligent System Application to Power Systems (ISAP '97), Jul. 6-10, 1997, Seoul, South Korea (pp. 60-65).

"Application of a Model-Based Fault Detection System to Nuclear Plant Signals," by K.C. Gross, R.M. Singer, S.W. Wegerich, J.P. Herzog, R. VanAlstine, and F. Bockhorst, presented at the International Conference on Intelligent System Application to Power Systems (ISAP '97), Jul. 6-10, 1997, Seoul, South Korea (pp. 66-70).

"Analysis and Processing of Shaft Angular Velocity Signals in Rotating Machinery for Diagnostic Applications," by Y. Kim, et al., IEEE Intl. Conf. on Acoustics, Speech, and Signal Processing, 1995 (vol. 5, pp. 2971-2974).

Black, Chris L., J. Wesley Hines, and Robert E. Uhlrig, Online Implementation of Instrument Surveillance and Calibration Verification Using Autoassociative Neural Networks, published in the proceedings of Maintenance and Reliability Conference (MARCON 97), May 20-22, 1997.

Black, Christopher L.; Uhrig, Robert E.; Hines, J. Wesley; "System Modeling and Instrument Calibration Verification with a Nonlinear State Estimation Technique", Maintenance and Reliability Conference Proceedings, May 12-14, 1998.

Cavallo, A., De Maria, G., Leccia, E., and Setola, R., "Robust Vibration Control of a DC9 Aircraft Frame," Proceedings of the 37th IEEE, Conference on Decision and Control, Dec. 1998, pp. 4039-4044, Tampa, Florida.

Griebenow et al. "Applied Pattern Recognition for Plant Monitoring and Data Validation." Presented at the Fifth International Joint ISA POWID/EPRI Controls and Instrumentation Conference, La Jolla, California, Jun. 19-21, 1995. (11 pages).

Gross, K.C., et al, "Sequential Probability Ratio Test for Nuclear Plant Component Surveillance", Nuclear Technology, vol. 93, p. 131, Feb. 1991.

Herzog, J. P., Y. Yue, and R. L. Bickford, "Dynamics Sensor Validation for Reusable Launch Vehicle Propulsion", presented at the 34th AIAA/ASME/SAE/ASEE Joint Propulsion Conference & Exhibit, Cleveland, Ohio, Jul. 13-15, 1998, AIAA-98/3604 (12 pages).

Hines et al., "Plant Wide Sensor Calibration Monitoring", Proceedings of the 1996 IEEE International Symposium on Intelligent Control, Sep. 1996, pp. 378-383.

Humenik, K, and K. C. Gross "Using Fourier Series Methods to Reduce Correlation of Nuclear Power Reactor Data", Nuclear Science and Engineering, vol. 112, Oct. 1992, pp. 127-135.

Humenik, K, et al, "Sequential Probability Ratio Tests for Reactor Signal Validation and Sensor Surveillance Applications", Nuclear Science and Engineering, vol. 105, Aug. 1990, pp. 383-390.

Singer, Ralph M., Kenny C. Gross, and Stephan Wegerich, "A Fault-Tolerant Sensory Diagnostics System for Intelligent Vehicle Application" by, presented at the IEEE International Symposium on Intelligent Vehicles, Detroit, MI, Sep. 25-26, 1995 (7 pages).

Wilson, D. Randall, et al., "Reduction Techniques for Instance-Based Learning Algorithms", Mar. 2000, Machine.Learning, vol. 38, No. 3, pp. 1-32.

Spoelder, H; "Virtual Instrumentation and Virtual Environments" IEEE Instrumentation and Measurement Magazine; vol. 2, Issue 3; Sep. 1999; pp. 14-19.

Srinivas Tatiraju et al., Multi-Rate Nonlinear State Estimation and Parameter Estimation in a Bioreactor, Biotechnology and Bioengineering, vol. 63, No. 1, Apr. 5, 1999.

Tarassenko. L. et al. Novelty Detection in Jet Engines. IEE Colloquium on Condition Monitoring: Machinery, External Structures and Health. Apr. 1999, pp. 4/1-4/5.

Tatiraju et al—Multi-Rate Nonlinear State and Parameter Estimation in a Bioreactor, 11pgs, 1998.

Teranet IA Incorporated, "ModelWare.TM. User's Manual", Copyright 1992.

Tucker, Ken "Modelware a New Approach to Prediction" Vendor's Forum, Jan./Feb. 1993 (pp. 14-15, 30).

Understanding Electronic Commerce, David Kosiur, 1997, Microsoft Press, a Division of Microsoft Corporation.

Various: "IEEE Instrumentation and Measurement Technology Conference Sensing, Processing, Networking"; Instrumentation and Measurement Technology Conference; vol. 2; May 19-21, 1997; pp. i-xxiii.

Wong, Man to; Geva, S.; Orlowski, M.; "Pattern recognition from neural network with functional dependency preprocessing", 1997, Proceedings of IEEE Speech and Technologies for Computing and Telecommunications.

Abstract of paper entitled Analytical Enhancements of Automotive Sensory System Reliability, publicly available before Apr. 30, 1998.

An International Search Report dated May 8, 2008, from the International Bureau in corresponding International (PCT) Application No. PCT/US07/078906.

Aynur A. Dayanik et al., Binning: Converting Numerical Classification into Text Classification, Jun. 2000, Seventeenth International Conference on Machine Learning, eight unnumbered pages.

B.R. Upadhyaya et al.; "An Integrated Approach for Sensor Failure Detection in Dynamic Processes"; Mar. 1987.

Caldwell et al—Remote Instrument Diagnosis on the Internet, 7 pgs, 1998.

Chen Chi-hau; "Statistical Pattern Recognition", 1973, Spartan Books.

D. Psaltis et al., "A multilayered neural network controller", 1988, IEEE Control Systems Magazine, vol. 8, issue 2, pp. 17-21.

D.J. Smith, "Integrating Power Plant Controls Increases Availability and Reduces Costs," Power Engineering, vol. 98, No. 9, pp. 25-29, Sep. 1994. (bibliographic citation and Abstract, pp. 11-12 of DIALOG File 2:INSPEC report).

David B. Skalak, "Prototype and Feature Selection by Sampling and Random Mutation Hill Climbing Algorithms", 1994, International Conference on Machine Learning, nine unnumbered pages.

David B. Skalak, "Prototype Selection for Composite Nearest Neighbor Classifiers", May 1997, University of Massachusetts Amherst, pp. 1-259.

David M.J. Tax and Robert P.W. Duin, "Support vector domain description", 1999, Pattern Recognition Letters, vol. 20, pp. 1191-1199.

Dreze, X. Zufryden, F., Testing Web Site Design and Promotional Content, Journal of Advertising Research, 1997, vol. 37; No. 2, pp. 77-91.

F. Hussain et al., "Discretization: An Enabling Technique", Jun. 1999, The National University of Singapore, pp. 1-27.

Freund, Rudolf J.; Wilson, William J.; "Statistical Methods", 1993, Academic Press.

Goodwin, G; "Evaluating the Performance of Virtual Sensors"; Proceedings Information, Decision and Control 1999; Feb. 8-10, 1999; pp. 5-12.

H.R. DePold and F.D. Gass, "The Application of Expert Systems and Neural Networks To Gas Turbine Prognostics And Diagnostics," Transanctions of the ASME, Journal of Engineering for Gas Turbines and Power, vol. 121, No. 4, pp. 607-12, Oct. 1999. (Bibliographic citation and Abstract, pp. 7-8 of DIALOG(R) File 2: INSPEC report).

Harris, T.J., et al. "Empirical Models for Intelligent Data Validation", Instrumentation, Controls, and Automation in the Power Industry; Proceedings of the . . . Power Instrumentation Symposium, Jun. 1992 vol. 35 (pp. 311-326).

Himmelblau et al., "On-Line Sensor Validation of Single Sensors Using Artifical Neural Networks", Proceedings of the American Control Conference, Jun. 1995, pp. 766-770.

http://mathworld.wolfram.com/DistributionFunction.html.

J.A. Walkensteubm W.B. Pardo, H.S. Robertson, and M. Monti, "An Inexpensive Hybrid Video Imaging System," Review of Scientific Instruments, vol. 66, No. 11, pp. 5385-5386, Nov. 1995. (bibliographic citation and Abstract, pp. 10-11 of DIALOG(R) File 2:INSPEC report).

Jain, A. K.; Murty, M. N.; Flynn, P. J.; "Data Clustering: A Review", ACM Computing Surveys, vol. 31, No. 3, Sep. 1999.

James Doughterty et al., "Supervised and Unsupervised Discretization of Continuous Features", 1995, in "Machine Learning: Proceedings of the Twelfth International Conference" ed. Armand Prieditis and Stuart Russell, Morgan Kaufmann Publishers, nine unnumbered pages.

Kah-Kay Sung et al., "Example-Base Learning for View-Based Human Face Detection", 1998, IEEE Transactions on Pattern Analysis and Machine Intelligence, vol. 20, No. 1, pp. 39-51.

Keller, May 1994, "Three Neural Network Based, Sensor Systems for Environmental Monitoring", pp. 377-382.

Kris Popat and Rosalind W. Picard, "Cluster-Based Probability Model and Its Application to Image and Texture Processing", Feb. 1997, IEEE Transactions on Image Processing, vol. 6, No. 2, pp. 268-284.

Lehoczky, J.P.; "Real-time queueing network Theory"; Real-Time Systems Symposium, 1997. Proceedings., The 18th IEEE, Dec. 2-5, 1997 pp. 58-67 [retrieved from IEEE database on May 14, 2009].

Long, T; Hanzevack, E; Bynum, W; "Sensor Fusion and Failure Detection Using Virtual Sensors"; Proceedings of the 1999 American Control Conference; vol. 4; Jun. 1999; pp. 2417-2421.

M. Feridun, "Diagnosis of Connectivity Problems in the Internet," Integrated Network Management, II. Proceedings of the IFIP TC6/VVG6 Second International Symposium, pp. 691-701, 1991. (bibliographic citation and Abstract, pp. 12-13 DIALOG(R) File 2:INSPEC report).

M. Furuya, T. Fukumoto, and T. Sekozawa, "WWW-Browser-Based Monitoring System for Industrial Plants," Conference of the IEEE Industiral Electronics Society, Part vol. 3, pp. 1146-41, 1999. (Bibliographic citation and Abstract. 2-3 of DIALOG(R) File 2:(INSPEC report).

M. Tarsala, "H-P. Computers Will Fix Themselves," CBS MarketWatch.com, Jan. 18, 2000, two pages from the Internet discussing Hewlett-Packard's plan for remote Internet access to diagnose and fix problems.

Maloney, Peter., and Peter M. Olin,"Pneumatic and Thermal State Estimators for Production Engine Control and Diagnostics" by SAE Technical Paper Series 980517, International Congress and Exposition, Feb. 23-26, 1998, Copyright 1998 Society of Automotive Engineers, Inc. (ISSN 0148-7191).

Miron et al., "Fault-Tolerance Improvement for a MSET Model of the Crystal River-3 Feedwater Flow System", 1998 IEEE Nuclear Science Symposium, ovember 1998, pp. 993-994.

Olivier Chapelle et al., "Support Vector Machines for Histogram-Based Image Classification", Sep. 1999, IEEE Transactions on Neural Networks, vol. 10, No. 5, pp. 1055-1064.

Orsagh, Rolf et al., "An Internet-based Machinery Health Monitoring System," MFPT Committee Meeting, Virginia Beach, VA, May, 2000.

Performance Consulting Services, "ACM Workstation User's Guide", Version 2001, Incorporated, Copyright 1994-2001.

R.A. Errath amd J.J. Dominguez, "Remote Drive Condition Monitoring," 1999 IEEE/-IAS/PCA Cement Industry Technical Conference, pp. 31-48,1999. (Bibliographic citation and Abstract, pp. DIALOG(R) File 2: INSPEC report).

Rajan et al, Jan. 1998; "Machine Learning Algorithm for Fault Diagnosis in Analog Circuits", pp. 1874-1879.

Robertson, Douglas Galen, Ph.D., "Development and statistical interpretation of tools for nonlinear estimation," Auburn University, 1996, 116 pages; AAT 9700752.

Rubinstein, Reuven Y.; "Simulation and the Monte Carlo Method", 1981, John Wiley & Sons.

Rudolph J. Freund and William J. Wilson, Statistical Methods, 1993, Academic Press, pp. 8-15 and 574-575.

S.J. Julier and J.K. Uhlmann, A New Extension of the Kalman Filter to Nonlinear Systems, In: Proc. AeroSense: The 11th International Symposium on Aerospace/Defence Sensing, Simulation and Controls (1997).

Sairam Valluri et al., Nonlinear State Estimation in the Presence of Multiple Steady States, Ind. Eng. Chem. Res. 1996, 35, 2645-2659.

Satnam Alag and Alice M. Agogino; "Intelligent Sensor Validation for On-Line Process Monitoring Diagnosis and Control"; Final Report 1993-94.

Shankar, R., "On-Line Monitoring of Instrument Channel Performance," EPRI Technical Report (TR) 104965-R1, Sep. 2000, pp. 1-370, Palo Alto, California.

SmartSignal web page downloaded from http://web.archive.org/web/19990209022642/http://www.smartsignal.com on May 5, 2010. SmartSignal, trademark with text Feb. 1999. p. 1-16.

Smith. J. Using Data Mining for Plant Maintenance. Plant Engineering. Dec. 2002, vol. 56, No. 12, pp. 26-30.

Sowizral, H; "Virtual Sensors"; Proceedings SPIE International Society for Optical Engineering; vol. 2409; Feb. 7-9, 1995; pp. 246-254.

Spatial Tech 2004 "For the First Time, Oil and Gas Lease Site Operators Will be Notified of Equipment Problems Before Costly Shutdowns" Dec. 2000. p. 1-3.

COMPLEX SIGNAL DECOMPOSITION AND MODELING

CROSS-REFERENCE TO RELATED APPLICATIONS

This application is a continuation of U.S. patent application Ser. No. 11/126,488, filed May 11, 2005, which is a continuation of U.S. patent application Ser. No. 09/800,977 filed on Mar. 8, 2001, and issued as U.S. Pat. No. 6,957,172, on Oct. 18, 2005, which claims the benefit of priority under 35 U.S.C. §119(e) to U.S. Provisional Application No. 60/187,949 filed Mar. 9, 2000.

BACKGROUND OF THE INVENTION

1. Field of the Invention

The present invention relates to process modeling and monitoring, especially using complex or periodic signals. Moreover, the invention relates to complex signal decomposition, modeling and classification for use in monitoring the operational state of any machine, process or signal. More particularly, a complex signal can be classified using the present invention for health monitoring or for information rectification.

2. Description of the Related Art

Well known conventional modeling and analysis methods use several sensors measuring operational system parameters to monitor equipment or processes—generically "systems". The related signals from sensors can be observed directly to understand how the system is functioning. Alternatively, for unattended operation, methods are well known for comparing real-time sensor signals against stored or predetermined thresholds in an automated fashion. When the signals exceed those thresholds, an exception condition or an alarm is generated, thus requiring human intervention only when a sensor datum value exceeds a corresponding threshold. Such methods focus on using the instantaneous value of sensors and other parameters to describe the current state of a system, but do not take advantage of time-domain information locked up in the sensor signals. It would be useful to take advantage of such time-domain information to better monitor the system, and even determine what operational state (among many acceptable states) the system is in.

In the field of vibration analysis, methods are known for examining the power spectral density function from an accelerometer or acoustic pickup to provide means for monitoring rotating or cyclic equipment. Typically, frequencies of interest are examined, and thresholds (lower or upper limit) are placed on the power level expected for these frequencies. If a threshold is pierced, this is indicative of an unsatisfactory operating condition or a developing problem. A great deal of work is involved in identifying the frequencies of interest and expected power levels for each particular piece of equipment that is monitored in this fashion. Problem diagnosis is also typically very specific to the kinds of indications presented with the appearance of the particular problem, and must be worked out specifically for each machine. It would be useful to have an empirical data-driven way of determining the health or the operational state of a machine based on one or more vibration or acoustic signals.

In a different technical area, digital data transmission is frequently accomplished—whether over a cable (e.g. Cat. 5, coaxial cable, etc.) or through radio transmission (e.g. broadcast, digital telecommunication, an IEEE 802.11b interface)—by modulation of an analog carrier signal. Further, to improve data transmission rates, the data being transmitted is compressed and encoded onto the transmission signal carrier, typically as sinusoidal waves encoding binary data in the phase and amplitude of the wave. Presently, well-known data encoding and transmission techniques include quadrature amplitude modulation (QAM) and discrete multitone (DMT). Well-known methods for extracting such encoded data include frequency filtering, signal decomposition and wavelet analysis.

However, during transmission these types of signals can suffer from attenuation and interference due to noise or transmission media deterioration, for example. In some cases, noise and signal degradation is sufficient to all but obliterate the original transmitted signal, making it impossible to extract the data encoded therein using prior art techniques. Accordingly, when noise or degradation is high, it would be useful to be able to reconstruct a meaningful signal from the noisy and/or attenuated signal that is being received. This essentially amounts to determining which of a finite set of datagrams an attenuated signal most closely resembles. There is a need for a signal analysis method that may be applied to a single complex signal to extract an original signal.

One empirical model-based monitoring technique known in the art is described in U.S. Pat. No. 5,764,509 to Gross et al., the teachings of which are incorporated herein by reference. In this technique, multiple sensor signals measuring physically correlated parameters are modeled in an empirical technique to provide estimates of those values. Discrepancies between the estimates and the actual values from the sensors indicate a developing process or machine failure, or sensor failure. The model generates the estimates using a reference library of selected historic snapshots of sensor values representative of known operational states. However, the described embodiments therein do not utilize the time domain information in the sensor signals, and instead usually treat the data in distinct and disconnected time-contemporaneous snapshots. It would be useful to provide the kind of empirical modeling of Gross et al. for use with time domain information. What is needed is a way of using a complex signal as an input to a multivariate modeling system such as that of Gross et al.

Where time domain information is locked up in one or more sensor or parameter signals detected from an instrumented process or machine, what is needed is a way to model the process or machine with the time-domain signal for one or more acceptable and identifiable states of operation, and to do so without investing a great deal of time and effort in coming up with first-principles equations that approximate those states. What is further needed is a way to categorize or classify system operational states based on a complex signal.

SUMMARY OF THE INVENTION

The present invention achieves the above needs by using an empirical modeling engine in combination with a complex signal decomposition technique, extracting multivariate information from at least one single complex signal. The extracted components are provided as individual inputs to the empirical modeling engine. The empirical modeling engine compares the extracted component inputs against expected values to derive more information about the actual or originating signal or about the state of the system generating the signal.

A complex signal or parameter, such as a time varying electrical signal (e.g., a electrocardiogram), is decomposed into multiple related signals by band notch filtering, wavelet analysis or other means. The multiple signals essentially form multivariate inputs to an empirical modeling engine, which generates signal estimates in response to the inputs. The modeling engine utilizes a stored reference set of prior known multivariate snapshots to generate the estimates. The estimates and the actual signals are compared in a sensitive statistical test to detect deviations between them, indicative of an unrecognized operational state. Alternatively, the empirical modeling engine compares the multivariate input snapshot to the snapshots in the reference set to determine which reference set snapshots are most similar to the input. A classification associated with the stored reference snapshots having the highest similarity is selected as the classification of the inputs, and the operational state represented by the complex signal is thus determined from a finite set of such known states represented in the reference set. Accordingly, not only can operational states of a system providing the complex signal be categorized, but also original datagrams can be reconstructed from degraded encoding carrier waves for digital data transmission, thereby affording greater range and accuracy.

Briefly summarized, the invention is implemented in a computer or other processor, having a memory for storing the reference set of snapshots of related signal values, and associated classifications or states, determined from empirical prior observations. An input means can be a data bus, messaging network or direct data acquisition device. The processor is disposed to compute estimates and compare them with the actual inputs to determine differences, or is alternatively disposed to select the classification from the reference set with highest similarity to the inputs. Classification or difference detection can be output to a screen or data file; used to send a paging message, email or fax; or made available to downstream data processing applications in the same computer or another computing system sharing a network or bus connection.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

DETAILED DESCRIPTION OF PREFERRED EMBODIMENTS

Figure 1:
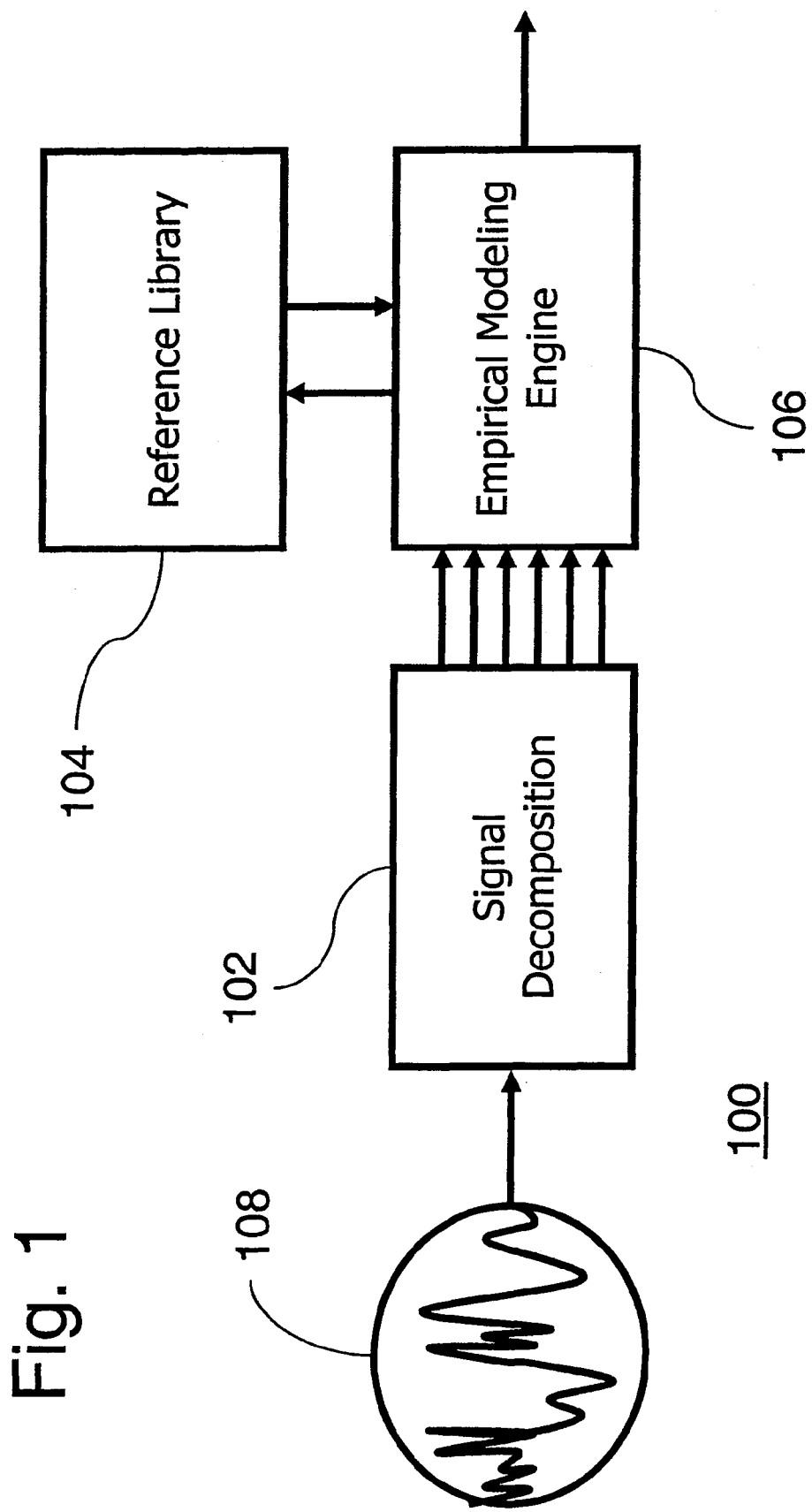
FIG. 1 is a diagram of the general embodiment of the present invention for signal decomposition and empirical modeling.

Turning now to the drawings and, more particularly, FIG. 1 generally shows the preferred embodiment signal decomposition and modeling system 100 of the present invention, which generally includes a signal receiver 108, a signal decomposition module 102, a reference library 104 and an empirical modeling engine 106. Signal receiver 108 serves to provide the complex signal to the signal decomposition module 102, which converts the signal to a plurality of correlated component signals. Empirical modeling engine 106 is disposed to receive the plurality of inputs, and with reference to a set of data embodying classification information or known operational information stored in reference library 104, output an indication about the complex signal and the system it is drawn from.

System 100 has application to any complex signal, whether naturally occurring, derived from a system, system operation or a process being carried out in a system or otherwise generated, naturally or artificially and received at the signal decomposition and modeling system 100 by an appropriate receiver 108. In particular, the complex signal may be representative of a physical parameter of a system, process or machine, including, for example, a biological process or system. More particularly, the complex signal can be an electrocardiogram signal for monitoring a heart; the current signature on the power draw of an electric motor; the pressure transducer signal from a metal stamping machine; and so on. Further, the complex signal may be a transmission carrier signal with information encoded thereon such as from telecommunications transmission, e.g., quadrature amplitude modulation (QAM) or discrete multitone (DMT) transmission. The above-described examples of complex signals are provided for example only and not intended as a limitation.

The present invention is preferably embodied in computer software, which may be contained on computer storage media, e.g. on a hard disk, a on a compact disk (CD), on a read only memory (ROM), on a floppy disk, on a digital versatile disk Rom (DVD-ROM), etc. The invention can also be embodied in and carried out by a microprocessor or microcontroller, with storage being generally available to store a reference library. The inventive system, method and program product can be used for monitoring a manufacturing process in real-time, or a signal received from equipment that is instrumented to detect the complex signal which contains information about the operational state of a monitored process or other equipment. The invention can also be used for extracting information from a communications transmission signal, for example, that is noisy or is severely degraded. In addition, the present invention may be applied to evaluating states of a complex data stream, as for example, stock market data, or other financial data. Further, the present invention also has application to monitoring and classifying heart signals, brainwaves or other important and complex biological signals.

A complex signal at receiver 108 is acquired from a real-time source or as a frame stored in a data file. For example, a complex signal may be generated by an accelerometer or an acoustic pick-up device that is monitoring a single physical parameter of a process or of a piece of equipment. The complex waveform may contain information on the operation of a vibrating or moving piece of equipment. The real-time source can be a data acquisition card, or can comprise a messaging socket executed as a protocol over a network, such as FieldBus, where the sensor data has been converted to a network-accessible data socket by upstream processing. The signal is digitized and decomposed in the Signal Decomposition Module 102. The Signal Decomposition Module 102 may employ one of any of a number of suitable signal decomposition techniques known in the art of signal processing. Periodically, the complex signal is decomposed into individual signal components forming a set of inputs that are sampled at synchronous observations to provide snapshots, $Y_{input}$. Preferably wavelet analysis is used to decompose the complex signal. Alternatively, the complex signal may be decomposed using frequency filters to extract an individual signal component within the bandpass of each frequency filter. The signal may be digitized before or after decomposition, with signal components being a digital result of decomposition. Thus, the output of the signal decomposition module 102, $Y_{input}$ is multiple correlated signal components. Each of these correlated components from ones of the frequency filters, for example, may be represented as a coefficient for a corresponding frequency, the coefficients for all of the frequencies forming the input vector, $Y_{input}$.

The reference library 104 generally contains prior data that is characteristic of expected signal component values. This prior data can be distilled from data collected off a real process or machine operating in known states. Alternatively, in the case of rectifying degraded encoded communications signals, the prior data in the reference library can be exemplary datagrams generated by algorithm. In either case, the reference library comprises at least a plurality of snapshots or vectors, each vector containing a like number of elements. Each element is the value of a component signal comprising the complex signal. Thus, if a complex signal is decomposed in module 102 using frequency band filters, then a given vector could comprise the amplitudes of each of the component frequency band signals at a single observation of those component signals, and would have as many elements as there are component signals. If the complex signal is decomposed using discrete wavelet transform, the reference set vectors can be constituted a number of alternative ways; for example by using the coefficients of a selected level of discrete wavelet transform as the vector element values. In any case, according to the invention, the reference library preferably comprises vectors having at least two elements. Furthermore, all the vectors must have a same number of elements. Finally, the elements in each vector must come from the same corresponding source, e.g., the first element of each vector comes from a first component signal, and the second element is always the value of the second component signal, and so on.

Typically, historical signal component values (signature vectors) are maintained in matrix form (designated D herein) in the reference library 104. Each signature vector is a column (or row) of the history matrix D and represents a previous decomposition of the complex signal at a selected period, i.e., is a snapshot of the signal and contains an entry for each component comprising the complex signal (see below for further discussion). The set of elements in the matrix D are referred to herein as a signal signature set. Snapshots (signature vectors) in the signal signature set of reference library 104, typically, are derived from nominal signals and so, are representative of expected complex signal states.

The empirical modeling module 106 periodically receives the decomposed signal samples (i.e., signal components) $Y_{input}$ as signal snapshots or data frames. Each snapshot $Y_{input}$ is compared to the data snapshots in the matrix D in the reference library 104. The empirical modeling module 106 compares the current signal snapshot $Y_{input}$ received from the decomposition module 102 with reference set snapshots for "similarity". This measure of "similarity" is computed using a similarity operator. According to the invention, the similarity operation for a pair of snapshots or vectors being compared returns a value, typically between zero and one, where zero represents dissimilarity and one represents completely identical snapshots. According to one class of similarity operator that works on an element-by-element basis, the measure of similarity is computed according to:

$$\vec{S} = \overline{D}^T \otimes \vec{Y}_{input} \quad (1)$$

where D is the reference library set of snapshots, $Y_{input}$ is the input snapshot, S is the vector of all snapshot similarities (one for each comparison of the $Y_{input}$ to a reference snapshot) and the similarity operation is designated by the symbol $\otimes$.

The similarity operation can be selected from a variety of known operators that produce a measure of the similarity or numerical closeness of rows of the first operand to columns of the second operand. The result of the operation as generally applied to two matrix operands is a similarity matrix wherein the similarity value of the ith row and jth column is determined from the ith row of the first operand and the jth column of the second operand (the operand above being a vector $Y_{input}$ and having only one column). The resulting element (i,j) is a measure of the sameness of these two vectors. In the present invention, the ith row of the first operand generally has elements corresponding to temporally related component values for a given decomposition of the complex signal from the process or machine, and the same is true for the jth column of the second operand. Effectively, the resulting array of similarity measurements represents the similarity of a reference vector in one operand to a current input vector in the other operand.

By way of example, one similarity operator that can be used compares the two vectors (the ith row and jth column) on an element-by-element basis. Only corresponding elements are compared, e.g., element (i,m) with element (m,j) but not element (i,m) with element (n,j). For each such comparison, the similarity is equal to the absolute value of the smaller of the two values divided by the larger of the two values. Hence, if the values are identical, the similarity is equal to one, and if the values are grossly unequal, the similarity approaches zero. When all the elemental similarities are computed, the overall similarity of the two vectors is equal to the average of the elemental similarities. A different statistical combination of the elemental similarities can also be used in place of averaging, e.g., median.

Another similarity operator that can be used in the present invention is the bounded area ratio test (BART) described in U.S. Pat. No. 5,987,399, which is incorporated by reference. BART is a prior art similarity operator, wherein an internal angle is used to gauge the similarity of two values. A right triangle is formed for each signal component with the base (hypotenuse) of each right triangle bounded by an expected magnitude range over all snapshots in the signal signature set for the particular component. The right angle vertex is preferably located at a point above the median or mean of the range, and at a height h that forms the right angle, the right angle vertex being the apex of the right triangle. At each comparison during system monitoring, BART maps two points $X_1$ and $X_0$ to the base; one point representative of an expected component value and the second point is a current component value. These two points are located on the base according to their magnitude within the range of values in the signal signature set. An internal comparison angle $\theta$ is formed at the apex above the base by drawing a line to the apex from each of the mapped points:

$$\theta = \tan^{-1}\left(\frac{h}{X_1}\right) - \tan^{-1}\left(\frac{h}{X_0}\right) \quad (2)$$

The internal angle is the basis by which two values are compared for similarity, i.e., identical points result in a 0° angle and completely dissimilar points result in a right angle. Then, the elemental similarity for the i$^{th}$ element is:

$$s_i = 1 - \frac{\theta_i}{\pi/2} \tag{3}$$

As indicated above, the elemental similarities can be statistically averaged or otherwise statistically treated to generate an overall similarity of a snapshot to another snapshot, as is called for according to the invention.

Yet another class of similarity operator that can be used in the present invention involves describing the proximity of one signature vector to another vector in n-space, where n is the dimensionality of the vector of the current snapshot of the monitored process or machine. If the proximity is comparatively close, the similarity of the two vectors is high, whereas if the proximity is distant or large, the similarity diminishes, ultimately vanishing. By way of example, Euclidean distance between two vectors can be used to determine similarity. In a complex signal decomposed into 20 components for example, the Euclidean distance in 20-dimensional space between the currently monitored snapshot, comprising a 20-element vector, and each vector in the reference library provides a measure of similarity, as shown:

$$S = \frac{1}{\left[\frac{1 + \|\vec{x} - \vec{d}\|^\lambda}{c}\right]} \tag{4}$$

wherein X is the current snapshot, and d is a vector from the reference library, and X and c are user-selectable constants.

It should be understood that, although specific similarity operators are described herein, any general similarity operator may be used in the empirical modeling engine of the present invention. The output of the empirical modeling engine 106 of FIG. 1 can be an indication based on the similarity measures generated for each comparison of a reference library vector to the input vector. A number of alternatives are discussed below.

Figure 2:
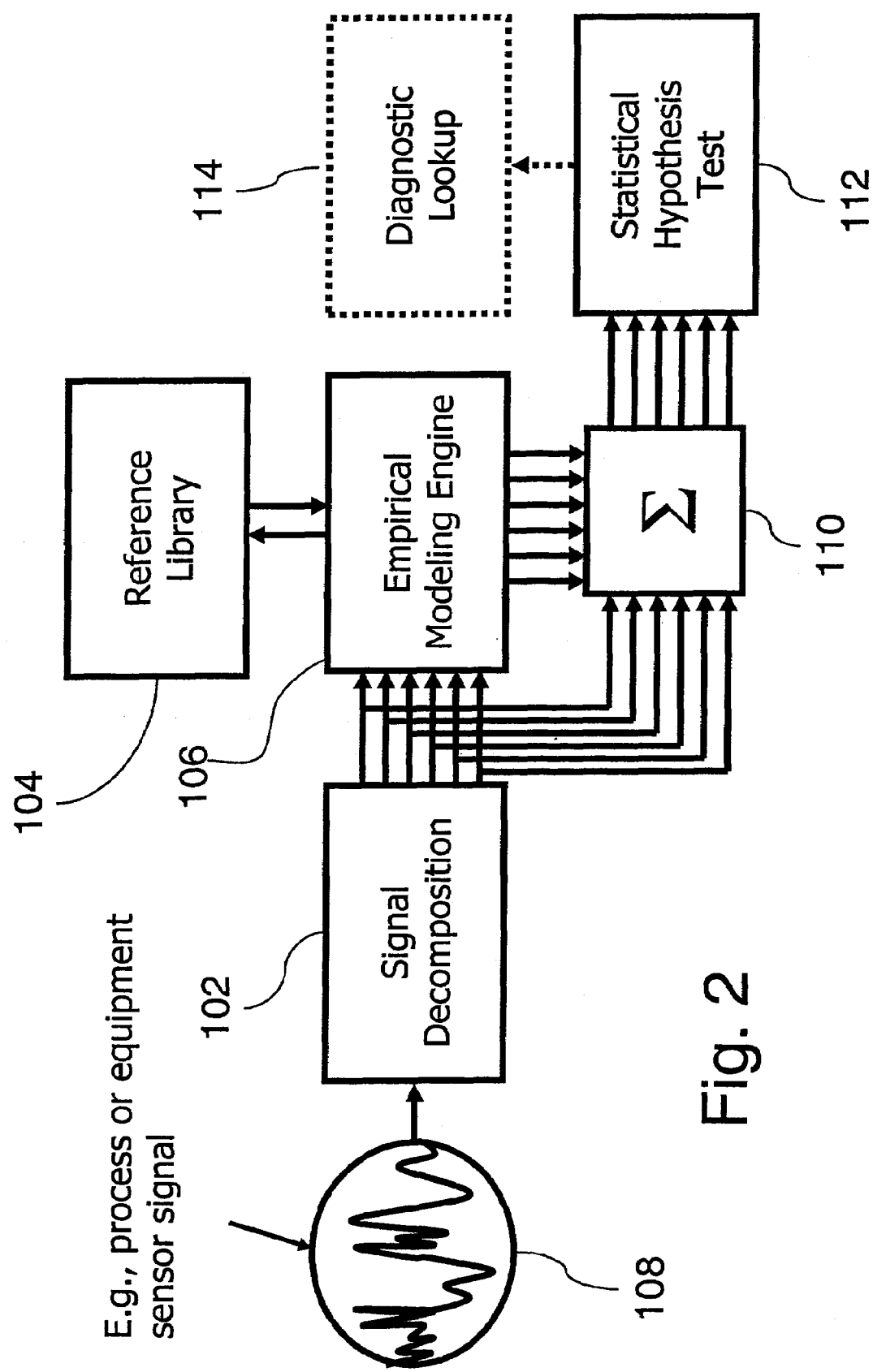
FIG. 2 is a diagram of an embodiment of the present invention for operational deviation detection.

Turning now to FIG. 2, an embodiment of the invention is shown for use in monitoring the operation of a process or machine, for detection of incipient failures, sensor failure, or operational state change. Items identical to those of FIG. 1 are labeled identically. The empirical modeling engine 106 generates a snapshot Y$_{expected}$, of estimated or expected values in response to the input snapshot Y$_{input}$, based on the similarity measures with the reference library 104 as discussed below. The current decomposed snapshot Y$_{input}$ is subtracted from the estimate Y$_{expected}$ in an adder 110 to yield component residual values. When the components of the decomposed snapshot Y$_{input}$ and the expected snapshot Y$_{expected}$ are close, the residuals are very nearly zero, indicating no incipient failures or state changes. When they are different, the residuals are other than zero. Using a sophisticated test, this difference can be ascertained even though the residuals are within the noise band of the system. A test module 112 is provided to receive and test the residuals to determine at the earliest determinable observation whether a deviation is evidenced in the residuals or not. There is generally one residual for each component signal in the model. An indication of difference between the expected values and the actual values of the component signals points to a deviation in the operation of the monitored process or machine as measured using the complex signal input to receiver 108. Finally, a diagnostic lookup table 114 can optionally be provided to output a likely failure mode is response to the pattern or deviations detected by the test module 112 in the residuals.

The empirical modeling engine 106 determines expected values of the complex signal components according to the following equation:

$$\vec{y}_{expected} = \overline{D} \cdot \vec{W} \tag{5}$$

where W is a weight vector having as many elements N as there are columns (or snapshots) in the reference library D 104, generated by:

$$\vec{W} = \frac{\hat{W}}{\left(\sum_{j=1}^{N} \hat{W}(j)\right)} \tag{6}$$

$$\hat{\underline{W}} = \left(\overline{D}^T \otimes \overline{D}\right)^{-1} \cdot \left(\overline{D}^T \otimes \vec{y}_{input}\right) \tag{7}$$

where the similarity operation is represented by the circle with the cross-hatch inside it. The superscript "T" here represents the transpose of the matrix, and the inverse of the matrix or resulting array is represented by the superscript "−1". Importantly, there must be row correspondence to like signal components for the rows in D, Y$_{input}$ and Y$_{expected}$. That is, if the first row of the reference matrix D corresponds to values for a first component of the decomposed complex signal, the first element of Y$_{input}$ must also be the current value (if operating in real-time) of that same first component.

Test module 112 can implement a comparison of the residuals to selected thresholds to determine when an alert should be output of a deviation in the complex signal from recognized states stored in the reference library. Alternatively, a statistical test, preferably the sequential probability ratio test (SPRT) can be used to determine when a deviation has occurred. The basic approach of the SPRT technique is to analyze successive observations of a sampled parameter. A sequence of sampled differences between the generated expected value and the actual value for a monitored component signal should be distributed according to some kind of distribution function around a mean of zero. Typically, this will be a Gaussian distribution, but it may be a different distribution, as for example a binomial distribution for a parameter that takes on only two discrete values (this can be common in telecommunications and networking machines and processes). Then, with each observation, a test statistic is calculated and compared to one or more decision limits or thresholds. The SPRT test statistic generally is the likelihood ratio l$_n$, which is the ratio of the probability that a hypothesis H$_1$ is true to the probability that a hypothesis H$_0$ is true:

$$l_n = \frac{(y_1, y_2, \ldots, y_n | H_1)}{(y_1, y_2, \ldots, y_n | H_0)} \tag{8}$$

where Y$_n$ are the individual observations and H$_n$ are the probability distributions for those hypotheses. This general SPRT test ratio can be compared to a decision threshold to reach a decision with any observation. For example, if the outcome is greater than 0.80, then decide H$_1$ is the case, if less than 0.20 then decide H$_0$ is the case, and if in between then make no decision.

The SPRT test can be applied to various statistical measures of the respective distributions. Thus, for a Gaussian distribution, a first SPRT test can be applied to the mean and a second SPRT test can be applied to the variance. For example, there can be a positive mean test and a negative mean test for data such as residuals that should distribute around zero. The positive mean test involves the ratio of the likelihood that a sequence of values belongs to a distribution $H_0$ around zero, versus belonging to a distribution $H_1$ around a positive value, typically the one standard deviation above zero. The negative mean test is similar, except $H_1$ is around zero minus one standard deviation. Furthermore, the variance SPRT test can be to test whether the sequence of values belongs to a first distribution $H_0$ having a known variance, or a second distribution $H_2$ having a variance equal to a multiple of the known variance.

For residuals derived for component signals from a complex signal behaving as expected, the mean is zero, and the variance can be determined. Then in run-time monitoring mode, for the mean SPRT test, the likelihood that $H_0$ is true (mean is zero and variance is $\sigma^2$) is given by:

$$L(y_1, y_2, \ldots, y_n | H_0) = \frac{1}{(2\pi\sigma)^{n/2}} e^{\left[-\frac{1}{2\sigma^2}\sum_{k=1}^{n} y_k^2\right]} \quad (9)$$

and similarly, for $H_1$, where the mean is M (typically one standard deviation below or above zero, using the variance determined for the residuals from normal operation) and the variance is again $\sigma^2$ (variance is assumed the same):

$$L(y_1, y_2, \ldots, y_n | H_1) = \quad (10)$$
$$\frac{1}{(2\pi\sigma)^{n/2}} e^{\left[-\frac{1}{2\sigma^2}\left(\sum_{k=1}^{n} y_k^2 - 2\sum_{k=1}^{n} y_k M + \sum_{k=1}^{n} M^2\right)\right]}$$

The ratio $l_n$ from equations 9 and 10 then becomes:

$$l_n = e^{\left[-\frac{1}{2\sigma^2}\sum_{k=1}^{n} M(M-2y_k)\right]} \quad (11)$$

A SPRT statistic can be defined for the mean test to be the exponent in equation 11:

$$SPRT_{mean} = -\frac{1}{2\sigma^2} \sum_{k=1}^{n} M(M - 2y_k) \quad (12)$$

The SPRT test is advantageous because a user-selectable false alarm probability α and a missed alarm probability β can provide thresholds against with $SPRT_{mean}$ can be tested to produce a decision:

1. If $SPRT_{mean} \leq l_n(\beta/(1-\alpha))$, then accept hypothesis $H_0$ as true;
2. If $SPRT_{mean} \geq l_n((1-\beta)/\alpha)$, then accept hypothesis H1 as true; and
3. If $l_n(\beta/(1-\beta)) < SPRT_{mean} < l_n((1-\beta)/\alpha)$, then make no decision and continue sampling.

For the variance SPRT test, the problem is to decide between two hypotheses: $H_2$ where the residual forms a Gaussian probability density function with a mean of zero and a variance of $V\sigma^2$; and $H_0$ where the residual forms a Gaussian probability density function with a mean of zero and a variance of $\sigma^2$. The likelihood that $H_2$ is true is given by:

$$L(y_1, y_2, \ldots, y_n | H_2) = \frac{1}{\left(2\pi V^{\frac{1}{2}}\sigma\right)^{n/2}} e^{\left[-\frac{1}{2V\sigma^2}\sum_{k=1}^{n} y_k^2\right]} \quad (13)$$

The ratio $l_n$ is then provided for the variance SPRT test as the ratio of equation 13 over equation 9, to provide:

$$l_n = V^{-\frac{1}{2}} e^{\left[-\frac{1}{2\sigma^2}\sum_{k=1}^{n} y_k^2\left(\frac{1-V}{V}\right)\right]} \quad (14)$$

and the SPRT statistic for the variance test is then:

$$SPRT_{variance} = \frac{1}{2\sigma^2}\left(\frac{V-1}{V}\right)\sum_{k=1}^{n} y_k^2 - \frac{\ln V}{2} \quad (15)$$

Thereafter, the above tests (1) through (3) can be applied as above:

1. If $SPRT_{variance} \leq l_n(\beta/(1-\alpha))$, then accept hypothesis $H_0$ as true;
2. If $SPRT_{variance} \geq l_n((1-\beta)/\alpha)$, then accept hypothesis $H_2$ as true; and
3. If $l_n(\beta/(1-\alpha)) < SPRT_{variance} < l_n((1-\beta)/\alpha)$, then make no decision and continue sampling.

Each snapshot of residuals (one residual "signal" per component signal from the complex signal) that is passed to the SPRT test module, can have SPRT test decisions for positive mean, negative mean, and variance for each parameter in the snapshot. In an empirical model-based monitoring system according to the present invention, any such SPRT test on any such parameter that results in a hypothesis other than $H_0$ being accepted as true is effectively an alert on that parameter. Of course, it lies within the scope of the invention for logic to be inserted between the SPRT tests and the output alerts, such that a combination of a non-$H_0$ result is required for both the mean and variance SPRT tests in order for the alert to be generated for the parameter, or some other such rule.

The output of the SPRT test module 112 will represent a decision for each decomposed signal input, as to whether the estimate is different or the same. These decisions, in turn, can be used to diagnose the state of the process or equipment being monitored. The occurrence of some difference decisions in conjunction with other sameness decisions can be used as an indicator of likely future machine health or process states. The SPRT decisions can be used to index into a diagnostic lookup database, automatically diagnosing the condition of the process or equipment being monitored.

Generally, any statistical hypothesis test as known by those skilled in the statistical arts can be substituted for the above-described application of SPRT. In addition, decisioning methods known in the art such as fuzzy logic sets and neural networks can be used to render a decision with regard to the sameness or difference of the estimates and the actual values.

In a setup and implementation phase for the embodiment of the invention shown in FIG. 2, nominal data from the complex signal pick-up is collected prior to monitoring the system. That nominal data is collected under expected operating conditions for the process or equipment and at known, acceptable or desired operating states. The nominal data is decomposed using the same decomposition method that will be used during monitoring, to provide periodically sampled signal component values as signature vectors in the reference library. Each vector represents an observation or snapshot, that is, a time-correlated set of values, one value from each of the decomposed components. Thus, for example, if a complex waveform such as an electrical current signal from a monitored electrical motor is analyzed using the invention, it may be decomposed using frequency filters to provide three frequency-range components, say <58 Hz, 58 Hz to 62 HZ, and >62 Hz, for each of two polarities, providing six inputs to the model. Then the reference library vectors comprise six-element vectors, each element being a signal amplitude at a time-correlated moment from each of the six frequency band component signals.

The collected nominal data is not used in its entirety in the reference library. Rather, the data is distilled down to a representative set sufficient to characterize the population of such snapshots. One method for doing this is described in the aforementioned U.S. Pat. No. 5,764,509, and is described therein as Min-Max. Essentially, vectors are selected for inclusion in the reference library if they contain a minimum or a maximum value for any one of the vector elements, across the entire nominal data set. This results in a set of vectors enumerated to no more than twice the number of vector elements. This group of vectors can be augmented using any number of methods with further vectors from the nominal data set.

Figure 3:
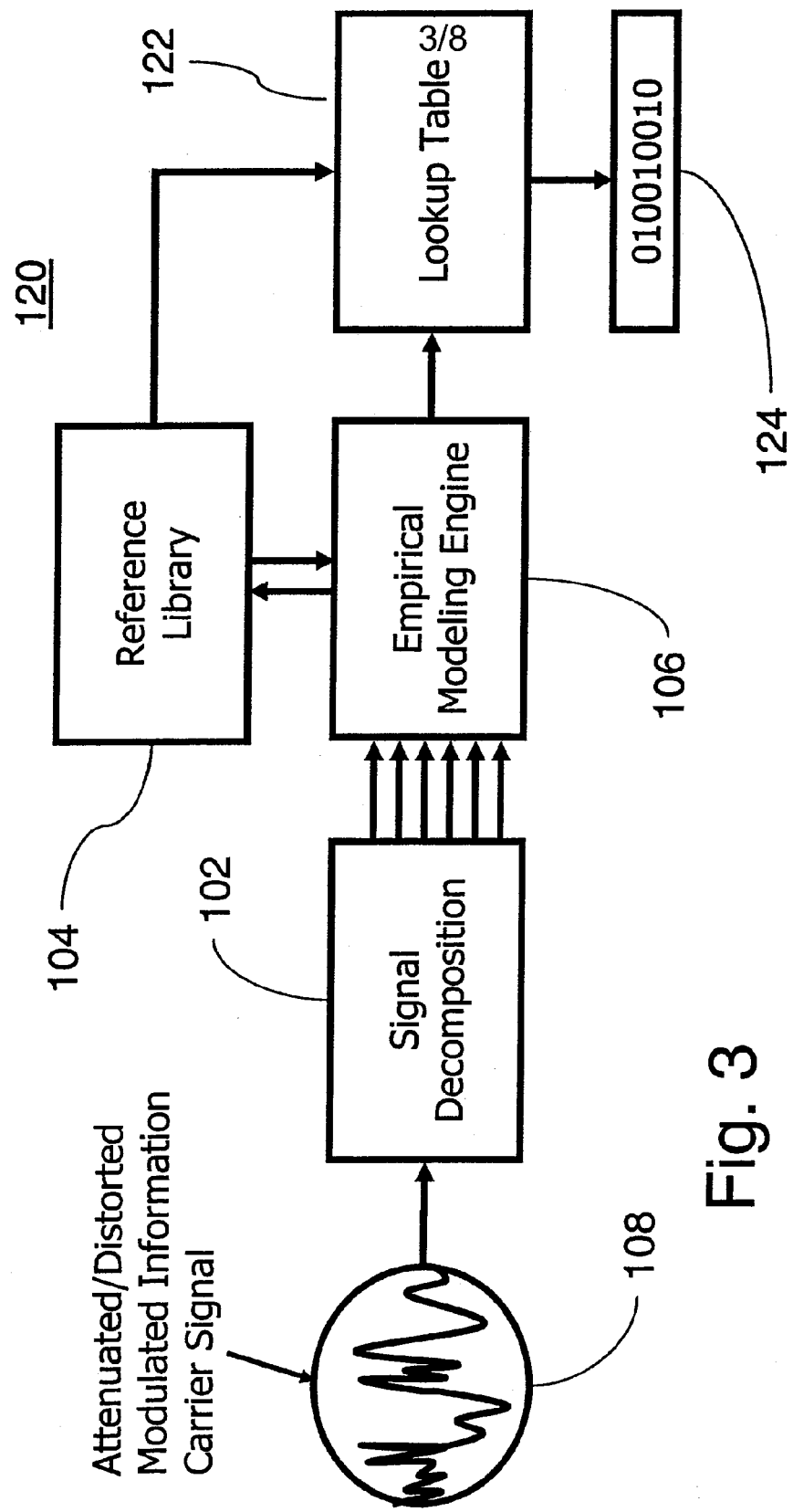
FIG. 3 is a diagram of an embodiment of the present invention for decoding digital information that has been compressed and encoded onto a modulated analog carrier wave that has been attenuated or degraded.

FIG. 3 shows another application of the present invention wherein the monitoring system 120 decodes encoded data from a noisy communications signal, e.g., a QAM or DMT signal. Elements identical to the system of FIG. 1 are labeled identically. For such a communications signal, the originally transmitted signal comprises typically a set of superimposed sinusoidal waves, the amplitude and period of which determines the data bits encoded in the carrier. Typically, a specific data word length is encoded together in these superimposed waves, such that decoding the waves at the receiving end results in a data word of the same bit length, e.g., 16 bits. The total "vocabulary" of superimposed waves that the carrier can take on is thus known ahead of time, and constitutes a finite set of states or datagrams (e.g., 16 for a simple QAM). Any deviation from this is noise or degradation present in the transmission line. The embodiment of FIG. 3 advantageously provides a computationally efficient way of finding the datagram in the reference library that is most similar to the transmitted signal, and thus most likely the originally intended datagram. So, in this embodiment, instead of directly decoding the received noisy communications signal to extract encoded data, as is done in the art, the noisy signal is compared in the empirical modeling engine 106 with signal signature vectors from reference library 104. The signature vector that is most closely matched by the noisy input signal is identified and the matching signal signature set vector is decoded based on that comparison. The matched vector may be decoded using a look up table 122, for example, and output as the decoded digital result 124.

The output 124 can be the literal data values from the reference library or an index into the signal signature set; or as shown in this example, the output 124 can be an index selecting a decoded value at a location in the lookup table 122. In this example, the similarity operation is carried out in the empirical modeling module 106 which compares input snapshots decomposed from the noisy, attenuated or degraded complex input signal with signal signature set snapshots, i.e., signature vectors. For each input snapshot, this comparison identifies the one reference library snapshot that has the greatest measure of similarity to the current state of the input signal, i.e., to the current input snapshot, using the similarity operator described above. A key value is associated with each of the signature vectors and is linked to a lookup table, thus identifying a corresponding decoded digital value with each signature vector. The digital value corresponding to the original signal is output from the lookup table 122 for each match.

To implement the system to be used to extract data from encoded information transmission, e.g. QAM or DMT, the reference library does not need to be populated from empirical data, as is the case for process or machine monitoring. Instead, because the original finite set of datagrams is known ahead of time, the reference library can be constructed from these directly.

Figure 4:
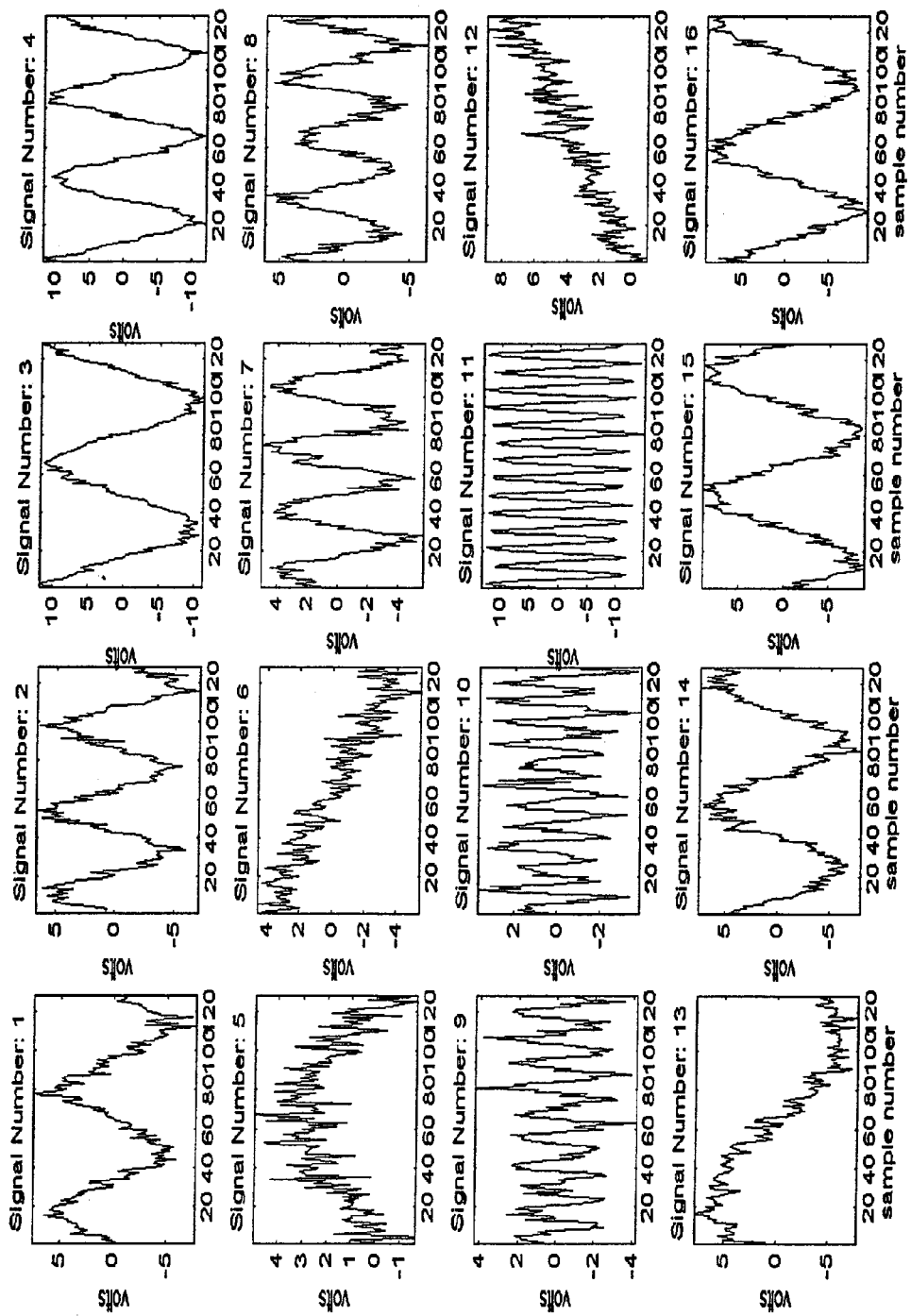
FIG. 4 illustrates 16 predetermined composite waveforms for conveying encoded digital information.

FIG. 4 shows 16 expected signal states (e.g., encoded transmission signals) conveying information using QAM, for example, each state corresponding to a different one of a four bit digital code. These 16 expected states or signatures are sampled and decomposed into component signals during a signature characterization phase using wavelet analysis, for example. Each state is decomposed into wavelet coefficients that form what are referred to as Detail Levels. Detail level 1 includes 64 wavelet coefficients; Detail level 2 includes 32; Detail Level 3 includes 16; Detail Level 4 includes 8; and Detail Level 5 includes 4. The wavelet coefficients from Detail Levels 3, 4, and 5 and the Approximation Level 5 yield 32 wavelet coefficients (16, 8, 4 and 4, respectively) and provide sufficient information for characterizing each of the 16 signatures. Thus, the reference library for decoding these datagrams can comprise 16 vectors, each having 32 elements, corresponding to the values of the 32 wavelet coefficients. In operation, the transmission signal (the complex signal being analyzed) is windowed and an appropriate window representing a datagram is decomposed using the same discrete wavelet transform into detail level 3, 4 and 5 and the approximation level 5 to provide a vector of 32 elements. This input vector is compared using the similarity operator in the empirical modeling engine to each of the 16 reference library vectors, and the highest similarity is designated the intended datagram.

Figure 5:
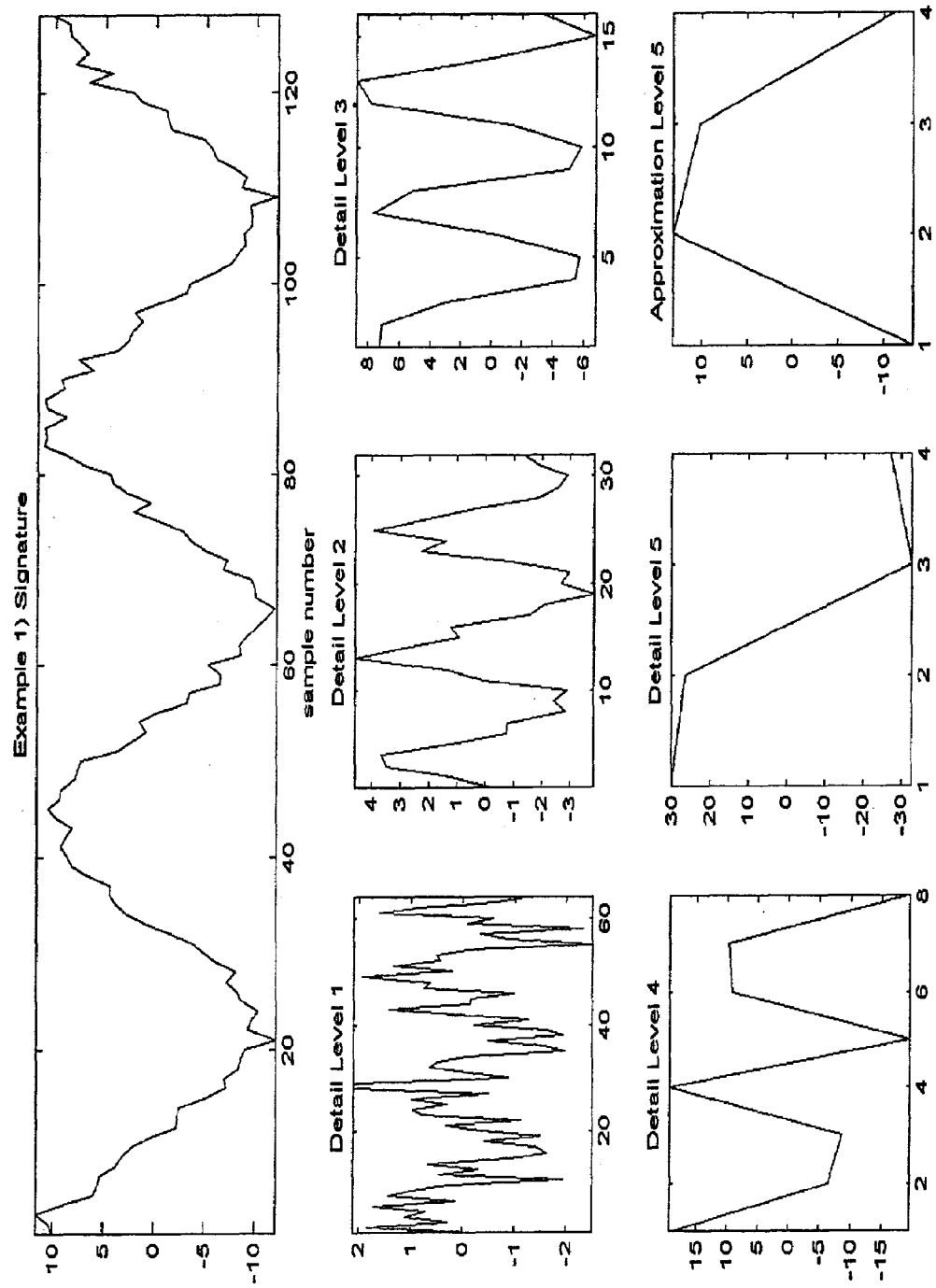
FIG. 5 is an example of a discrete wavelet transform on the Signal Number 4 shown in FIG. 4 using the Haar wavelet.

FIG. 5 shows an example of discrete wavelet transform of the Signal Number 4 of FIG. 4. In this example, detail levels 1 and 2 are shown, but are not included in the signal signature set or similarity analysis, so that a vector formed to represent the Signal Number 4 in the reference library will contain 32 elements shown in FIG. 5: 16 from the detail level 3, 8 from detail level 4, four from detail level 4, and four from approximation level 5. However, it is understood that the unused wavelet coefficients from detail levels 1 and 2 could be included if desired. Methods are known in the art for developing a full wavelet packet decomposition tree for a complex signal, and ascertaining which detail levels and which approximations contain significant information. These prior art methods can be used in conjunction with the current invention to determine the composition of the vectors that make up the reference library and the input snapshot. The empirical modeling engine is able to render a similarity score for each comparison regardless of the wavelet decomposition used, as long as just one wavelet analysis is selected for processing the input and the reference library.

Figure 6:
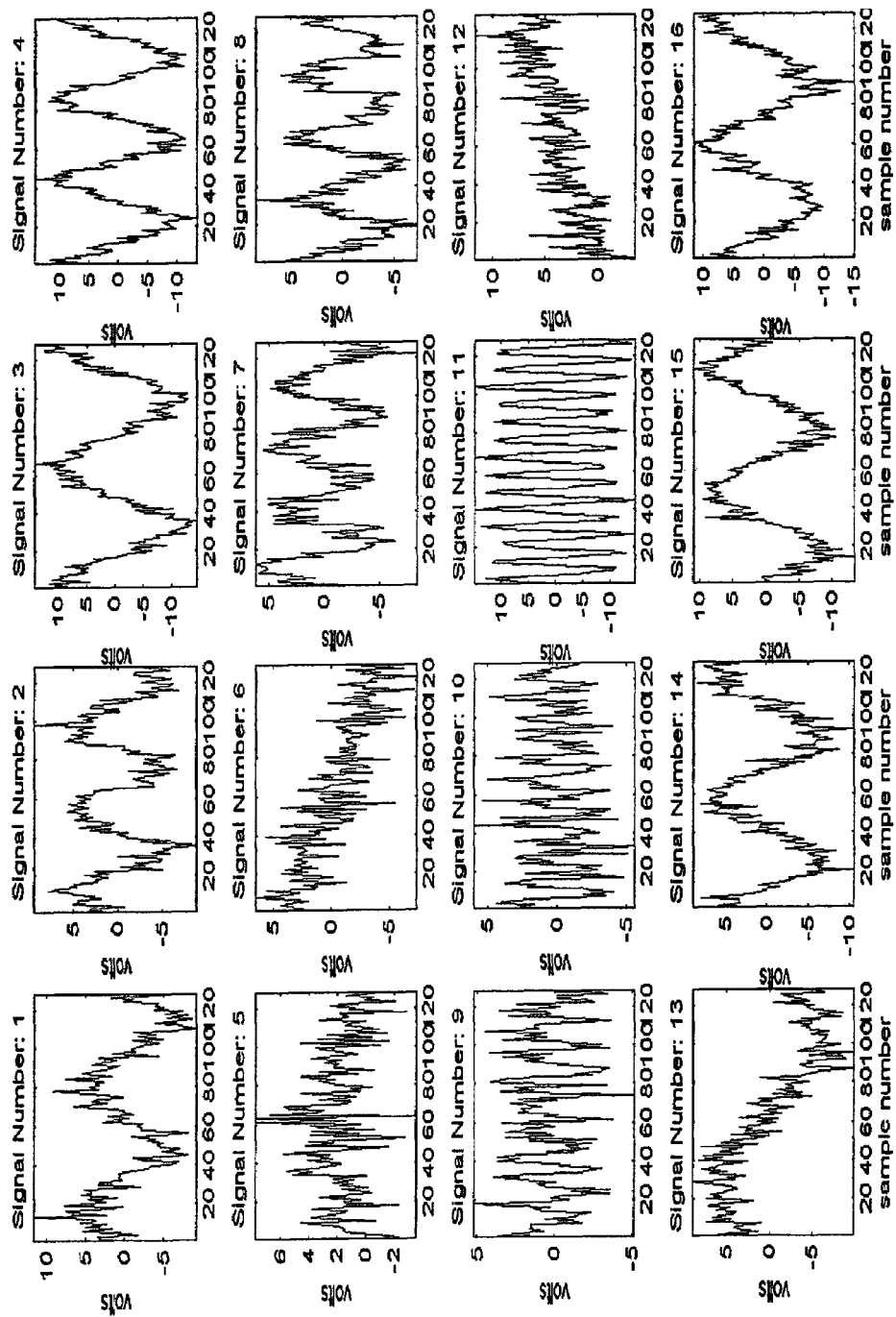
FIG. 6 shows the 16 composite waveforms of FIG. 4 with random additive noise to emulate distortion in transmission.

An example of a noisy or distorted version of each signature from FIG. 4 is shown in FIG. 6. Random additive noise has been added to the signatures in FIG. 6, however the signals have not been attenuated. The decomposition module 102 receives these distorted complex signals—each encoded with one of the 16 signatures—and decomposes them. The decomposition module 102 may be disposed to first identify a window on the complex signal for decomposition, particularly when discrete datagrams are being carried on an essentially continuous carrier wave. A variety of methods are known in the telecommunications arts for achieving this windowing, such as including a start pulse and stop pulse of particular frequency and/or amplitude to identify the window. As an alternative, the decomposition module 102 can continuously decompose the carrier signal over a shifting window of fixed width, and the decomposed components of each such shifted window can be processed for similarity by the empirical modeling engine 106, such that only similarities above a minimum threshold result in identification of a datagram. Other methods known in the art may be used in the present invention for windowing.

The real-time noisy complex signal is periodically decomposed (according to the windowing method chosen) into detail level components to produce a current snapshot of 32 wavelet coefficients, again dispensing with detail levels 1 and 2. The empirical modeling engine 106 compares the detail level components against stored signal signature vectors. So, the empirical modeling engine 106 accepts each snapshot, i.e., the wavelet coefficients in detail levels 3, 4, 5 and approximation level 5, and performs a similarity operation for that snapshot versus each of the 16 signature vectors in the reference library signal signature set. More specifically, in each signature comparison, a pair of sets of 32 wavelet coefficients (one signal signature vector and the decomposed snapshot from the actual input) are compared, comparing each corresponding element in the pair. The comparison identifies the one signature vector of the 16 in the signature set that most closely matches the input snapshot. Then, the empirical modeling engine 106 selects the four-bit code corresponding to the matched signature vector from the lookup table 122 and outputs that code as a digital output 124.

So, for example, using the bounded angle ratio test (BART) for the comparison, a minimum and a maximum value at each end of a right triangle hypotenuse defines the range found for a given coefficient across all 16 signatures in the reference library. The input signal coefficients are compared for similarity, mapping each input coefficient and a corresponding signature vector coefficient along the particular hypotenuse according to the value of the coefficient within the range. Line segments are drawn from each mapped point to the apex. The internal angle between the drawn line segments is less than or equal to ninety degrees. That internal angle is normalized to 90 degrees and, the normalized result is subtracted from one to yield a similarity value between one and zero. That similarity value is a measure of similarity for the pair of corresponding elements, one (1) indicating identity and zero (0) indicating dissimilarity. The similarity values for all 32 components (i.e. wavelet coefficients) in each pair are averaged to provide an overall measure of similarity between the signatures.

Figure 7:
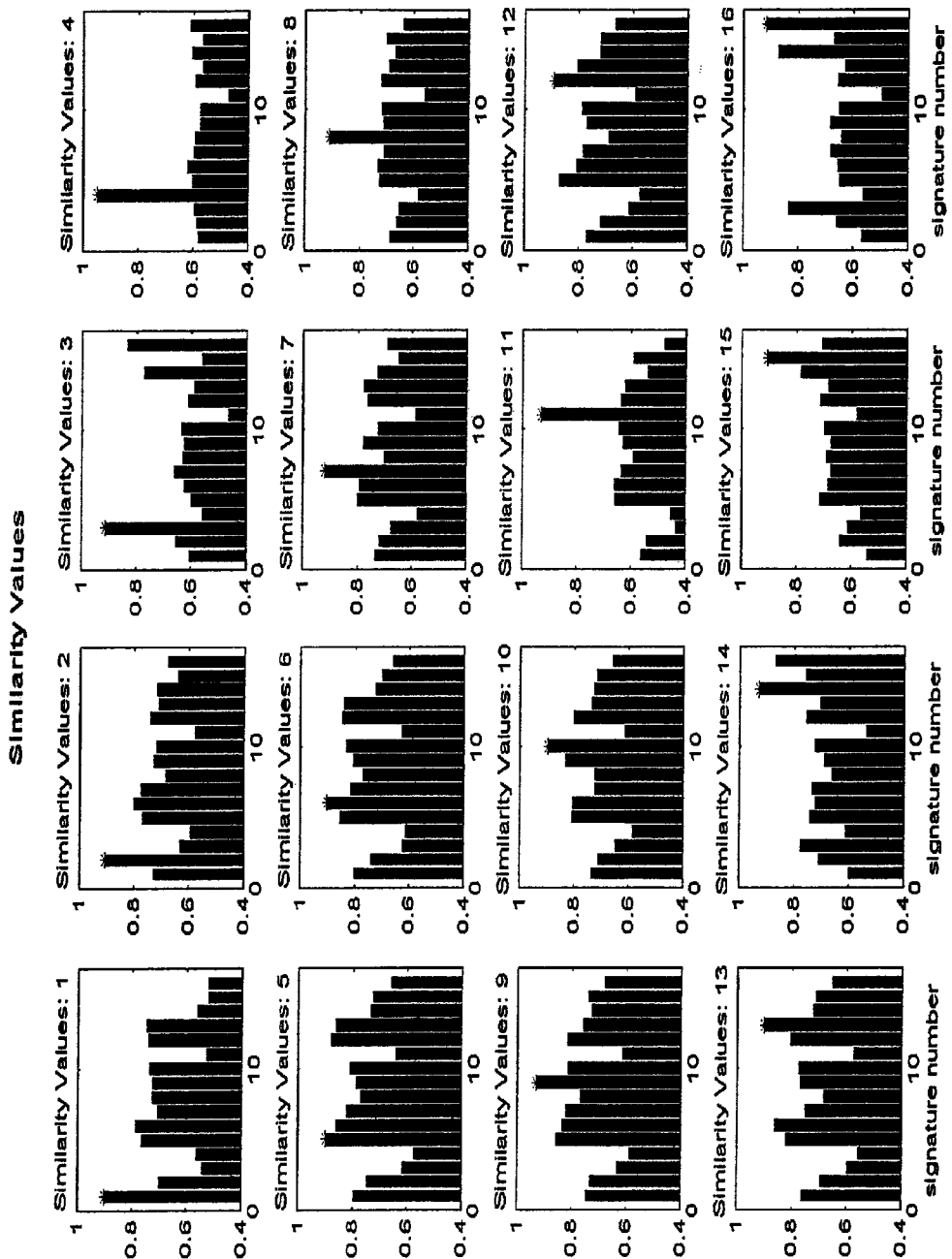
FIG. 7 shows bar graphs indicating similarity values of the 16 signatures of FIG. 4 as compared with the noisy signals of FIG. 6.

Turning to FIG. 7, results are shown of similarity measurements between the noisy signals of FIG. 6 and the original datagrams of FIG. 4. Each of the 16 graphs corresponds to one of the noise-distorted signal graphs in FIG. 6. Within each graph are sixteen bars comprising the bar chart, one bar for each of the 16 model signals from FIG. 4 that make up the reference library. Each bar represents the vector similarity value of a reference library datagram to the particular noisy datagram from FIG. 6 for that chart. In each comparison, one reference library signature is identified as being closest to the noisy input vector. The match is indicated by an asterisk on the bar having the highest similarity value. In each of the 16 comparisons, the preferred embodiment system automatically scored the correct noisy input signal as being the most similar to the original reference library signature.

Accordingly, the system of the present invention can accurately identify the correct reference signature from a noisy input signature, thereby, acting as a superior filter for transmission noise to facilitate extracting correct information content from a degraded carrier signal. The reference library may also have associated with each vector an index for directing a lookup into a lookup table, so that encoded digital information may be automatically extracted and decoded with a much higher degree of accuracy than has been heretofore achieved.

Figure 8:
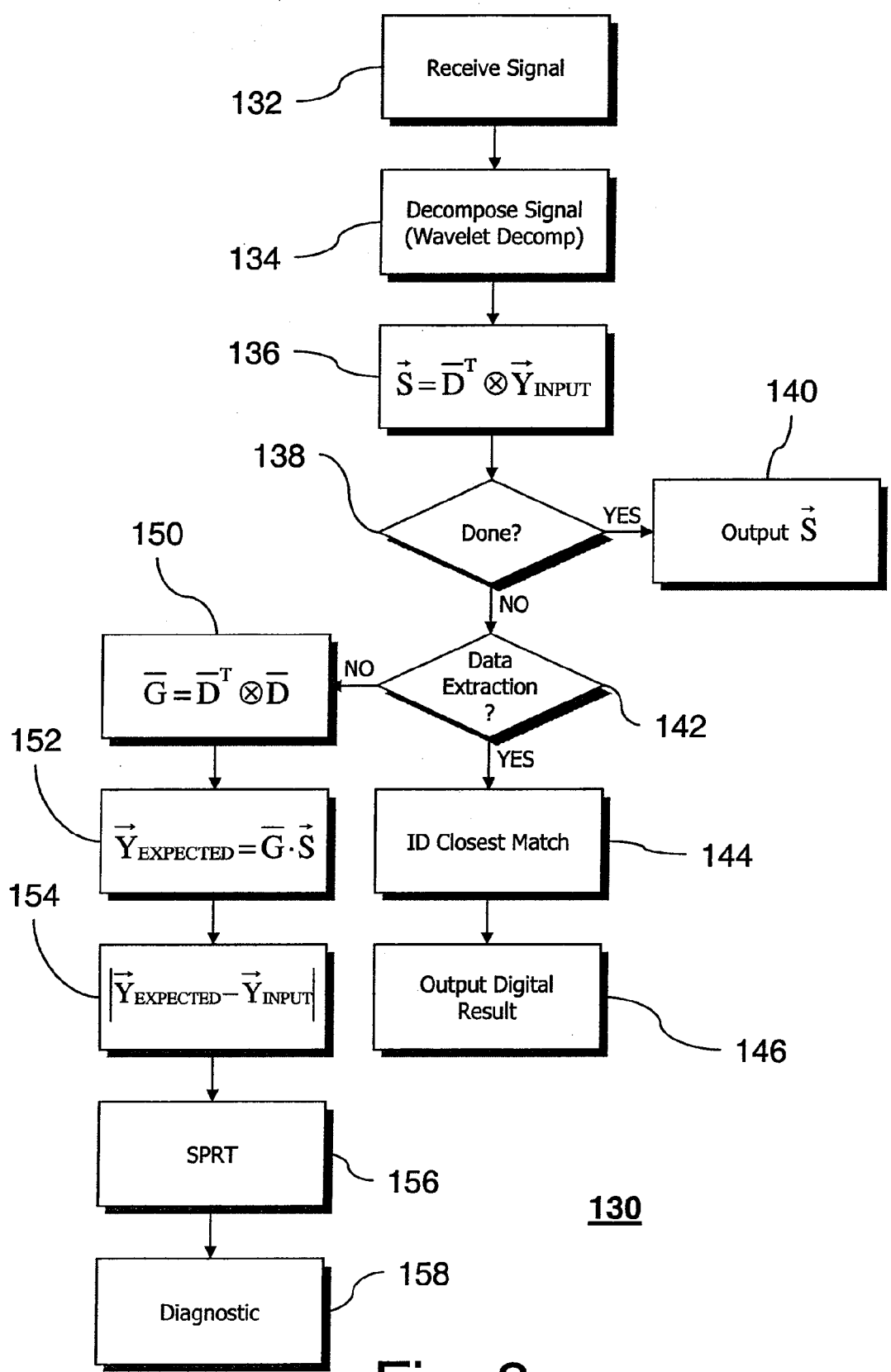
FIG. 8 is a flow diagram of the preferred embodiment signal comparison method.

FIG. 8 is a flow diagram 130 showing the steps of the preferred embodiment of the present invention. First in step 132, a signal is received and passed to the decomposer. Then, in step 134, the signal is decomposed into components using, for example, wavelet decomposition or signal filters. Next, in step 136, the decomposed signal components are compared against the signal signature set. In step 138, a check is made to determine if additional steps are to be taken or if additional analysis is to be done on the comparison results and, if not, in step 140 the comparison result is output.

If additional steps are to be taken on the comparison result, then, in step 142 a check is made to determine whether data is to be extracted from the signal, e.g., communication data. If it is determined that the signal contains encoded data (e.g. the signal is a data transmission signal), then, in step 144, the signal signature vector closest to the input snapshot is identified. In step 146 the lookup table is searched for a digital value corresponding to the matching vector and, that corresponding digital value is passed to the output.

If the signal is not carrying encoded data but, instead is a signal from a sensor monitoring a system, then, in step 150, a G matrix is determined, being equivalent to the first term from equation 7 above:

$$\hat{W} = \overline{G}^{-1} \cdot (\overline{D}^T \otimes \vec{y}_{input}) \tag{16}$$

$$\overline{G} = (\overline{D}^T \otimes \overline{D}) \tag{17}$$

It should be noted that the G matrix may be generated prior to receiving any signal, then stored locally, retrieved for use in step 150 and made available for subsequent system analysis. In step 152 the expected signal is generated by multiplying the G matrix with the similarity values vector, as per equation 5 above. In step 154 the difference between the expected signal and the input signal is calculated. In step 156 SPRT analysis is applied to the calculated result from step 154. Finally, in step 158, an appropriate diagnostic is run on the SPRT result.

It is contemplated that the present invention has wide application in a number of fields, and may take many physical embodiments. In any process control setting, the invention can embody a computer connected to a network or the process control system, wherein the complex signal would be received by means of a data acquisition card or a network card, and processed in the computer processor according to software instructions in memory. The output of the computer embodiment can be supplied to the screen of the computer, or made available via a network connection to either downstream processing, such as in the control system itself, or to remote viewing, as in a web browser on another computer. In another embodiment, the invention comprises a hardware device specifically for analyzing the complex signal, which may be a heartbeat or an electric motor current. In this embodiment, a processor is also typically provided in the device, along with memory for storing the data and the model or reference data. The device then preferably includes the sensor or set of sensors and their electrical signal connections for detecting the complex signal in question. In an on-board embodiment, the invention may comprise a set of microprocessor instructions that are part of a broader digital signal processor (DSP) instruction set running a DSP embedded in a machine, such as an automobile or an electric motor. In this case, receipt of the complex signal is typically already provided for in the embedded DSP as an existing sensor, such as a voltmeter or the like. Finally, the invention can also be practiced off-line as a program in a standard desktop or workstation environment, where the complex signal is provided as a data file stored on media. Generally across these embodiments, the signal decomposition module can be a software-driven processor, a DSP or other microprocessor dedicated to the task, an application-specific integrated circuit (ASIC) customized to decompose in hardware, or even an arrangement of simple circuit elements (such as filters) that decompose the complex signal in its analog state, prior to any digitization for processing.

It should be appreciated that a wide range of changes and modifications may be made to the embodiments of the invention as described herein. Thus, it is intended that the foregoing detailed description be regarded as illustrative rather than limiting and that the following claims, including all equivalents, are intended to define the scope of the invention.

What is claimed is:

1. An apparatus for monitoring the operating condition of a system, comprising:
   sensor means for acquiring a single time-varying signal characterizing operation of the system;
   means for decomposing said single time-varying signal into a plurality of components represented by vectors of actual component values, each vector having actual component values each at least partially representing the same moment in time;
   a memory for storing a plurality of reference snapshots of reference component values for known operating conditions; and
   processor means responsive to the decomposing means, disposed to generate estimates of the component values using an example-based multivariate empirical modeling engine using a calculation that uses both the reference component values and the vectors of actual component values to calculate expected component values for each vector of actual component values, and
   further disposed to generate residual values by differencing the actual component values and the expected component values, for determination of deviating operating conditions of the system.

2. An apparatus according to claim 1, wherein said decomposing means uses wavelet analysis to decompose the time-varying signal into coefficients.

3. An apparatus according to claim 1, wherein said decomposing means generates a power spectral density function for the time-varying signal to provide component signals representative of power levels related to a plurality of frequency ranges.

4. An apparatus according to claim 1, wherein said processor means further compares at least one said residual value to a threshold to determine deviating operating conditions of the system.

5. An apparatus according to claim 1, wherein said processor means further performs a sequential probability ratio test on successive values of at least one said residual value to determine deviating operating conditions of the system.

6. An apparatus according to claim 1, wherein said sensor means measures vibration of said system.

7. An apparatus according to claim 1, wherein said sensor means measures acoustic energy given off of said system.

8. An apparatus according to claim 1, wherein said sensor means measures electric current used in said system.

9. A method for monitoring the operating condition of a system, comprising the steps of:
   acquiring a single time-varying signal characterizing operation of the system;
   periodically extracting observations of features from the single time-varying signal, each feature relating to a component signal represented by actual component values, the actual component values each at least partially representing the same moment in time, and wherein the actual component values are wavelet coefficients for said single time-varying signal;
   generating estimates, by a processor, for at least one of the extracted features responsive to extracting an observation of features, using an example-based multivariate empirical modeling engine using a calculation with both the actual component values and reference component values stored in a library of feature observations characteristic of acceptable operation of said system to calculate expected component values; and
   differencing, by a processor, at least one of said expected component values with corresponding actual component values to produce residuals for determination of deviating operating conditions of said system.

10. A method according to claim 9, further comprising the step of determining whether at least one of said residuals exceeds a threshold.

11. A method according to claim 9, further comprising the step of performing a sequential probability ratio test on at least one of said residuals.

12. A method according to claim 9, wherein the step of extracting features includes generating a power spectral density function for said time-varying signal.

* * * * *